(12) United States Patent
Pae

(10) Patent No.: US 7,097,704 B1
(45) Date of Patent: Aug. 29, 2006

(54) TINTABLE ABRASION RESISTANT COATING COMPOSITION AND METHODS OF MAKING AND USING SAME

(75) Inventor: Youngun Pae, Costa Mesa, CA (US)

(73) Assignee: SDC Technologies, Inc., Anaheim, CA (US)

( * ) Notice: Subject to any disclaimer, the term of this patent is extended or adjusted under 35 U.S.C. 154(b) by 0 days.

(21) Appl. No.: 10/667,005

(22) Filed: Sep. 16, 2003

Related U.S. Application Data

(60) Provisional application No. 60/411,322, filed on Sep. 16, 2002.

(51) Int. Cl.
*C09D 1/00* (2006.01)

(52) U.S. Cl. .................. 106/287.11; 556/420

(58) Field of Classification Search ........... 106/287.11; 556/420
See application file for complete search history.

(56) References Cited

U.S. PATENT DOCUMENTS

| | | |
|---|---|---|
| 3,780,132 A | 12/1973 | Lohr |
| 3,922,440 A | 11/1975 | Wegworth et al. |
| 4,027,073 A | 5/1977 | Clark |
| 4,081,421 A | 3/1978 | Yoshida et al. |
| 4,211,823 A | 7/1980 | Suzuki et al. |
| 4,355,135 A | 10/1982 | January |
| 4,390,373 A | 6/1983 | White et al. |
| 4,405,679 A | 9/1983 | Fujioka et al. |
| 4,442,168 A | 4/1984 | White et al. |
| 4,485,130 A | 11/1984 | Lampin et al. |
| 4,594,290 A | 6/1986 | Fischer et al. |
| 4,756,827 A | 7/1988 | Mayer |
| 5,013,608 A | 5/1991 | Guest et al. |
| 5,013,788 A | 5/1991 | Nagashima et al. |
| 5,102,695 A | 4/1992 | Guest et al. |
| 5,120,811 A | 6/1992 | Glotfelter et al. |
| 5,314,947 A | 5/1994 | Sarawagi |
| 5,316,791 A | 5/1994 | Farber et al. |
| 5,354,881 A * | 10/1994 | Chang et al. ............... 556/419 |
| 5,367,019 A | 11/1994 | Sawaragi |
| 5,426,204 A * | 6/1995 | Harisiades et al. ......... 556/419 |
| 5,789,082 A | 8/1998 | Treadway |
| 5,789,476 A | 8/1998 | Iryo et al. |
| 5,907,000 A | 5/1999 | Treadway |
| 5,919,860 A | 7/1999 | Roesler et al. |
| 5,958,514 A | 9/1999 | Havey et al. |
| 6,001,163 A | 12/1999 | Havey et al. |
| 6,057,039 A | 5/2000 | Takeshita et al. |
| 6,342,097 B1 | 1/2002 | Terry et al. |
| 6,346,331 B1 | 2/2002 | Harvey |
| 6,348,269 B1 | 2/2002 | Terry |
| 6,534,568 B1 * | 3/2003 | Katz et al. .................. 523/212 |
| 6,538,092 B1 | 3/2003 | Terry et al. |
| 6,757,465 B1 * | 6/2004 | Yokokawa et al. ......... 385/113 |

FOREIGN PATENT DOCUMENTS

| | | |
|---|---|---|
| CA | 2071692 | 12/1992 |
| DE | 4118826 A1 | 12/1991 |
| DE | 4020316 A1 | 1/1992 |
| EP | 0407174 A2 | 1/1991 |
| EP | 0526975 A2 | 2/1993 |
| EP | 0601782 B1 | 5/1997 |
| EP | 0570165 B1 | 10/1997 |
| JP | 58141250 | 8/1983 |
| JP | 446975 | 2/1992 |
| JP | 4198379 | 7/1992 |
| JP | 407291817 A | 11/1995 |
| JP | 409118757 A | 5/1997 |
| WO | WO 9516522 | 6/1995 |
| WO | WO 9629154 | 9/1996 |
| WO | WO 9846692 | 10/1998 |
| WO | WO 0024831 | 5/2000 |

OTHER PUBLICATIONS

Chemical Abstract, vol. 126, No. 1, Jan. 1997, Columbus, Ohio, US; Abstract No. 9335, Kato, H., E.A.: "Siloxane coat compositions with improved resistance to abrasion, UV, and heat for plastic optical materials" XP002075220 (see abstract & JP 08 239 627 A (Ito Optical Ind Co. Ltd.).

"Cycloaliphatic Epoxide Based Sol-Gel Derived Materials"; Better Ceramics Through Chemistry VI, Material Research Society Symposium Proceedings, 1994, V. 346, Sigel, Domszy and Welch.

"A New Type of A Sol-Gel-Derived Inorganic-Organic Nanocomposite"; Better Ceramics Through Chemistry VI, Material Research Society Symposium Proceedings, 1994, V. 346, Kasemann, Schmidt, Wintrich.

* cited by examiner

*Primary Examiner*—Margaret G. Moore
(74) *Attorney, Agent, or Firm*—Dunlap, Codding & Rogers, P.C.

(57) ABSTRACT

The present invention relates, in general, to tintable abrasion resistant coating compositions utilizing a tint additive and methods of making and using same. More particularly, but not by way of limitation, the tint additive is a polyethylene oxide polymer that is end capped on at least one "R" group with a silica containing compound.

31 Claims, 20 Drawing Sheets

(a)

| Tint Time | [Silylated PEO], Wt. % | | | |
|---|---|---|---|---|
| | 3 | 5 | 7 | 9 |
| 5 | 90.9 | 89.2 | 86.2 | 82.3 |
| 10 | 89.9 | 86.4 | 79.9 | 71.6 |
| 20 | 86.7 | 77.4 | 62 | 50.7 |
| 30 | 82.3 | 65.9 | 43.5 | n/a |

(b)

| Tint Time | [Silylated PEO], Wt. % | | | |
|---|---|---|---|---|
| | 3 | 5 | 7 | 9 |
| 5 | 89.3 | 85 | 77.9 | 60.5 |
| 10 | 83.7 | 72.2 | 58.2 | 32.7 |
| 15 | 76.4 | 58.5 | 40.8 | 19.6 |
| 20 | 68.9 | 47.3 | 29.2 | n/a |

(c)

| Tint Time | [Silylated PEO], Wt. % | | | |
|---|---|---|---|---|
| | 3 | 5 | 7 | 9 |
| 5 | 89.8 | 85.2 | 78.8 | 61.7 |
| 10 | 85 | 73.7 | 61.1 | 40 |
| 15 | 77.8 | 59.5 | 44 | 25.9 |
| 20 | 69.6 | 46.8 | 31.5 | n/a |

FIG. 2

| Sample | Adhesion | | | % TLT | | | |
|---|---|---|---|---|---|---|---|
| | Initial | 5 min | 10 min | Initial | 5 min | 10 min | 15 min |
| Tintable coating | Pass | fail | n/a | 91.6 | 65.8 | n/a | n/a |
| PR-1135/Tintable coating | Pass | pass | pass | 91.7 | 64.6 | 42.8 | 29.6 |
| PR-1165/Tintable coating | Pass | pass | pass | 91.8 | 65.9 | 45.5 | 35.2 |

FIG. 7

| pH | Bayer ratio | 30 min %TLT | Viscosity, cP |
|---|---|---|---|
| 4.55 | 3.8 | 24.3 | 25.9 |
| 4.67 | 3.7 | 26.8 | 27.7 |
| 4.74 | 4.0 | 28.3 | 60.0 |
| 4.82 | 3.7 | 25.8 | 152.0 |

FIG. 12

| Properties | w/o silylated PEO | w/ silylated PEO |
|---|---|---|
| 5 min %TLT | 87.6 | 43.9 |
| Bayer ratio | 7 | 3.3 |

FIG. 15

| Properties | w/o silylated PEO | w/ silylated PEO |
|---|---|---|
| 5 min %TLT | 86.7 | 51.2 |
| Bayer ratio | 6 | 3.6 |

FIG. 16

| Properties | w/o silylated PEO | w/ silylated PEO |
|---|---|---|
| FT, micron | 2.9 | 4.3 |
| 30 min %TLT | 80.9 | 42.6 |
| Bayer ratio | 3.2 | 3.1 |

FIG. 17

| Tests | Type of tint additive | | |
|---|---|---|---|
| | PEO | PEO/NCO=1/0.75 | PEO/NCO=1/2 |
| 5 min %TLT | 24 | 62.1 | 85.2 |
| 10 min %TLT | 14.4 | 38.3 | 73.7 |
| Post-tint appearance | Streaks | Some streaks | Good |
| Bayer | 2.9 | 4.2 | 4.9 |

FIG. 20

TINTABLE ABRASION RESISTANT COATING COMPOSITION AND METHODS OF MAKING AND USING SAME

CROSS-REFERENCE

This application claims benefit under 35 U.S.C. 119(e) to provisional application U.S. Ser. No. 60/411,322, filed Sep. 16, 2002, entitled "TINTABLE ABRASION RESISTANT COATING COMPOSITION AND METHOD OF MAKING AND USING SAME", the entire contents of which are hereby expressly incorporated herein in their entirety by reference.

BACKGROUND OF THE INVENTION

1. Field of the Invention

The present invention relates, in general, to tintable abrasion resistant coating compositions utilizing a tint additive and methods of making and using same. More particularly, but not by way of limitation, the tint additive is a silylated polyethylene oxide polymer—i.e. a polyethylene oxide polymer that is end capped on at least one "R" group with a silicon containing compound.

2. Brief Description of the Background Art

The prior art is replete with compositions which, when applied to substrates and cured, provide transparent, abrasion resistant coatings on the substrates. Such coatings are especially useful for polymeric substrates where it is highly desirable to provide substrates with abrasion resistant surfaces, with the ultimate goal to provide abrasion resistant surfaces which are comparable to glass. While the compositions of the prior art have provided transparent coating compositions having improved abrasion resistant properties, such prior art compositions are generally lacking when compared to glass. Thus, a need has long existed for improved compositions having improved stability and which, when applied to a substrate, such as a polymeric substrate, and cured provide transparent, highly abrasion resistant coatings. Additionally, such known coating compositions do not readily allow for a tint to be added to the coating composition after the coating composition has cured on the substrate. The ability to add a tint to such a cured coating composition is highly desirous. It is to such compositions that are tintable and processes by which such tintable compositions are manufactured and applied to substrates that the present invention is directed.

SUMMARY OF THE INVENTION

The present invention provides a coating composition that is capable of being tinted after application to a substrate. The coating composition comprises a tint additive represented by the formula, $R_1$—$(OCH_2CH_2)_n$—O—$R_2$ and a base compound. At least one of $R_1$ and $R_2$ is silane containing group represented by the formula,

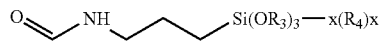

$R_3$ is H, an alkyl group containing from about 1 to about 5 carbon atoms, or an acetyl group. $R_4$ is H, an epoxy functional group, an alkyl group, a functional alkyl group, an alkylene group, an aryl group, an alkyl ether, and combinations thereof containing from about 1 to about 10 carbon atoms. X is an integer from 0 to about 3 and n is a positive integer. Only one of $R_1$ or $R_2$ is the silane containing group, $R_1$ or $R_2$ is H.

The base compound is selected from the group consisting of: (1) Coating compositions which comprise an aqueous organic solvent mixture containing from about 10 to about 99.9 weight percent, based on the total solids of the composition, of a mixture of hydrolysis products and partial condensates of an epoxy functional silane and a tetrafunctional silane and from about 0.1 to about 30 weight percent, based on the total solids of the composition, of a multifunctional compound, selected from the group consisting of multifunctional carboxylic acids, multifunctional anhydrides and combinations thereof, the epoxy functional silane and the tetrafunctional silane are present in the aqueous organic solvent mixture in a molar ratio of from about 0.1:1 to about 5:1, the coating compositions may further include from about 0.1 to about 50 weight percent of a mixture of hydrolysis products and partial condensates of one or more silane additives, based on the total solids of the composition, and/or an amount of colloidal silica or a metal oxide or combinations thereof equivalent to from about 0.1 to about 50 weight percent solids, based on the total solids of the composition; (2) coating compositions which comprise an aqueous organic solvent mixture containing from about 10 to about 99.9 weight percent, based on the total solids of the composition, of a mixture of hydrolysis products and partial condensates of an epoxy functional silane, a disilane, and from about 0.01 to about 80 weight percent, based on the total weight of the composition, of a carboxylic acid functional compound selected from the group consisting of carboxylic acids, multifunctional carboxylic acids, anhydrides, and combinations thereof, the epoxy functional silane and the disilane are present in the aqueous organic solvent mixture in a molar ratio of from about 0.05:1 to about 5:1, the coating compositions may further include from about 0.1 to about 80 weight percent of a mixture of hydrolysis products and partial condensates of one or more silane additives, based on the total solids of the composition, and/or an amount of colloidal silica or a metal oxide or combinations thereof, equivalent to from about 0.1 to about 75 weight percent solids, based on the total solids of the composition; (3) coating compositions which comprise an aqueous organic solvent mixture containing from about 10 to about 90 weight percent, based on the total solids of the composition, of a mixture of hydrolysis products and partial condensates of an epoxy functional silane, from about 1 to about 90 weight percent, based on the total solids of the composition, of a carboxylic acid functional compound selected from the group consisting of carboxylic acids, multifunctional carboxylic acids, anhydrides, and combinations thereof, from about 1 to 90 weight percent, based on the total weight of the composition, of a metal oxide composite colloid, and from about 1 to 75 weight percent, based on the total solids of the composition, of a colloidal silica material, the coating compositions may further include from about 0.1 to about 50 weight percent of a mixture of hydrolysis products and partial condensates of one or more silane additives, based on the total solids of the composition; (4) coating compositions which comprise an aqueous organic solvent mixture containing from about 10 to about 90 weight percent, based on the total solids of the composition, of a mixture of hydrolysis products and partial condensates of an epoxy functional silane, from about 1 to about 90 weight percent, based on the total weight of the composition, of a carboxylic acid functional compound selected from the group consisting of carboxylic acids, multifunctional carboxylic acids, anhydrides, and combinations thereof, from about 1 to 90 weight percent, based on the total solids of the composition, of a metal oxide composite colloid, from about 1 to 75 weight percent, based on the total solids of the composition, of a colloidal silica material, and from about 1 to 75 weight percent, based on the total solids of the composition, of a tetrafunctional silane; (5) coating compositions which comprise an aqueous organic solvent mixture containing from about 10 to about 90 weight percent, based on the total solids of the composition, of a mixture of hydrolysis products and partial condensates of an epoxy functional silane, from about 1 to about 90 weight percent, based on the total weight of the composition, of a carboxylic acid functional compound selected from the group consisting of carboxylic acids, multifunctional carboxylic acids, anhydrides, and combinations thereof, from about 1 to 90 weight percent, based on the total solids of the composition, of a metal oxide composite colloid, and from about 1 to 75 weight percent, based on the total solids of the composition, of a disilane; and (6) combinations thereof.

The hydrolysis products and partial condensates of the epoxy functional silane and the tetrafunctional silane may be present in the aqueous-organic solvent mixture in an amount of from about 10 to about 99.9 weight percent, based on the total solids of the coating composition, and the multifunctional compound may be present in the aqueous-organic solvent mixture in an amount of from about 0.1 to about 30 weight percent, based on the total solids of the coating composition.

The solvent constituent of the aqueous-organic solvent mixture may be selected from the group consisting of an alcohol, an ether, a glycol, a glycol ether, an ester, a ketone, a glycolether acetate and mixtures thereof. The solvent constituent of the aqueous-organic solvent mixture may be an alcohol having the general formula ROH where R may be an alkyl group containing from 1 to about 10 carbon atoms. The solvent constituent of the aqueous-organic solvent mixture may be selected from the group consisting of a glycol, an ether, a glycol ether and mixtures thereof having the formula $R^1-(OR^2)_x-OR^1$ where x may be an integer of 0, 1, 2, 3 or 4, $R^1$ may be H or an alkyl group containing from 1 to about 10 carbon atoms and $R^2$ may be an alkylene group containing from 1 to about 10 carbon atoms and combinations thereof. At least a portion of the solvent component of the aqueous-organic solvent mixture may be generated during hydrolysis of the epoxy functional silane and the tetrafunctional silane.

The epoxy functional silane may be present in a molar ratio to the tetrafunctional silane of from about 0.1:1 to about 3:1. The epoxy functional silane may be represented by the formula $R^3_x Si(OR^4)_{4-x}$ where x may be an integer of 1, 2 or 3, $R^3$ may be H, an alkyl group, a functionalized alkyl group, an alkylene group, an aryl group, an alkyl ether, and combinations thereof containing from 1 to about 10 carbon atoms and having at least 1 epoxy functional group, and $R^4$ may be H, an alkyl group containing from 1 to about 5 carbon atoms, an acetyl group, a $-Si(OR^5)_{3-y}R^6_y$ group where y may be an integer of 0, 1, 2, or 3, and combinations thereof where $R^5$ may be H, an alkyl group containing from 1 to about 5 carbon atoms an acetyl group, another $-Si(OR^5)_{3-y}R^6_y$ group and combinations thereof, and $R^6$ may be H, an alkyl group, a functionalized alkyl group, an alkylene group, an aryl group, an alkyl ether and combinations thereof containing from 1 to about 10 carbon atoms.

The tetrafunctional silane may be represented by the formula $Si(OR^7)_4$ where $R^7$ may be H, an alkyl group containing from 1 to about 5 carbon atoms and ethers thereof, an $(OR^7)$ carboxylate, a $-Si(OR^8)_3$ group where $R^8$ may be a H, an alkyl group containing from 1 to about 5 carbon atoms and ethers thereof, an $(OR^8)$ carboxylate, another $-Si(OR^8)_3$ group and combinations thereof.

The hydrolysis products and partial condensates of the epoxy functional silane and the tetrafunctional silane may be present in the aqueous-organic solvent mixture in an amount of from about 10 to about 99.9 weight percent, based on the total solids of the coating composition, and the multifunctional compound may be present in the aqueous-organic solvent mixture in an amount of from about 0.1 to about 30 weight percent, based on the total solids of the coating composition. In addition, the epoxy functional silane may be represented by the formula $R^3_x Si(OR^4)_{4-x}$ where x is an integer of 1, 2 or 3, $R^3$ is H, an alkyl group, a functionalized alkyl group, an alkylene group, an aryl group, an alkyl ether and combinations thereof containing from 1 to about 10 carbon atoms and having at least 1 epoxy functional group, and $R^4$ is H, an alkyl group containing from 1 to about 5 carbon atoms, an acetyl group, a $-Si(OR^5)_{3-y}R^6_y$ group where y is an integer of 0, 1, 2, or 3, and combinations thereof where $R^5$ is H, an alkyl group containing from 1 to about 5 carbon atoms, an acetyl group, another $-Si(OR^5)_{3-y}R^6_y$ group and combinations thereof, and $R^6$ is H, an alkyl group, a functionalized alkyl group, an alkylene group, an aryl group, an alkyl ether and combinations thereof containing from 1 to about 10 carbon atoms.

The amount of water present in the aqueous-organic solvent mixture may be an amount sufficient to provide a substantially homogeneous mixture of hydrolysis products and partial condensates of the epoxy functional silane and the tetrafunctional silane.

At least a portion of the solvent component of the aqueous-organic solvent mixture may be generated during hydrolysis of the epoxy functional silane and the tetrafunctional silane, and the aqueous-organic solvent mixture may further comprise an amount of a catalyst to provide enhanced abrasion resistance to a coating produced by curing the composition. The effective amount of the catalyst may be from about 0.1 to about 10 weight percent, based on the total solids of the composition.

The aqueous-organic solvent mixture further may comprise from about 0.1 to about 50 weight percent, based on the total solids of the composition, of a mixture of hydrolysis products and partial condensates of a silane additive represented by the formula $$R^9_x Si(OR^{10})_{4-x}$$

where x may be an integer of 1, 2 or 3, $R^9$ may be H, an alkyl group containing from 1 to about 10 carbon atoms, a functionalized alkyl group, an alkylene group, an aryl group, an alkyl ether group and combinations thereof, $R^{10}$ may be H, an alkyl group containing from 1 to about 10 carbon atoms, an acetyl group and combinations thereof.

The aqueous-organic solvent mixture may further comprise an effective amount of a leveling agent to spread the aqueous-organic solvent mixture on the substrate and provide substantially uniform contact of the aqueous-organic solvent mixture with the substrate.

The aqueous-organic solvent mixture may further comprise an effective amount of colloidal silica to provide the composition with from about 0.1 to about 50 weight percent silica, based on the total of solids present in the composition.

The substrate may be formed of plastic, wood, ceramic, glass ceramic, glass, mineral based, leather, paper, textile and metal materials.

The present invention further provides a process for providing a substantially transparent, abrasion resistant coating capable of being tinted on a substrate. An effective amount of an aqueous-organic solvent mixture is applied to at least one surface of the substrate. The mixture comprises hydrolysis products and partial condensates of an epoxy functional silane, a tetrafunctional silane and a multifunctional compound, an amount of water, and the tint additive described hereinabove. The multifunctional compound is selected from the group consisting of multifunctional carboxylic acids, multifunctional anhydrides and combinations thereof. The epoxy functional silane is present in a molar ratio to the tetrafunctional silane of from about 0.1:1 to about 5:1. The amount of water is sufficient to hydrolyze the epoxy functional silane and the tetrafunctional silane. Upon curing, the coating composition produces the substantially transparent, abrasion resistant coating capable of being tinted on the substrate. The process may further comprise treating the substrate to enhance adhesion of the substantially transparent, abrasion resistant coating to the substrate. The curing of the aqueous-organic solvent mixture coating to produce a substantially transparent, abrasion-resistant coating on the substrate may be achieved by heating the substrate having the aqueous-organic solvent mixture coating applied thereto to a temperature of from about 50.degree. C. to about 200.degree. C. for a period of time effective to cure the coating and provide the substrate with a substantially transparent, substantially uniform abrasion resistant coating having a Bayer number of at least 5.

The present invention provides an article comprising a substrate and the coating composition described hereinabove. The coating composition is formed on at least one surface of the substrate. The coating is formed by curing an aqueous-organic solvent mixture applied to the at least one surface of the substrate.

Other objects, features and advantages of the present invention will become apparent from the following detailed description when read in conjunction with the accompanying drawings and appended claims

BRIEF DESCRIPTION OF THE SEVERAL VIEWS OF THE DRAWINGS

FIG. 2 tabularly shows the tintability of coating compositions containing Si-PEO (produced according to a 1/2 ratio of HO-PEO/NCO) having a molecular weight of 300 for: (A) R.I. (Refractive Index) 1.56 lenses cured at 155E C for 1 hour; (b) R.I. 1.56 lenses cured at 110E C for 3 hours; and (C) CR-39 lenses cured at 110E C for 3 hours.

FIG. 7 tabularly shows the tintability of a polycarbonate lens coated with primers (PR-1135 and PR-1165 commercially available from SDC Technologies, Inc.) when coated with a coating composition of MP-1154D modified with Si-PEO.

FIG. 12 tabularly shows the effect of pH on the abrasion resistance, tintability and viscosity of the coating compositions modified with Si-PEO of the present invention.

FIG. 15 tabularly shows the comparison of the abrasion resistance and tintability of a refractive index coating composition of IM-1202 modified and unmodified with Si-PEO (MW=400).

FIG. 16 tabularly shows the comparison of the abrasion resistance and tintability of a coating composition of IM-1186 (SDC Technologies, Inc.) modified and unmodified with Si-PEO (MW=400).

FIG. 17 tabularly shows the comparison of the abrasion resistance and tintability of a coating composition of PF-1202 (SDC Technologies, Inc.) modified and unmodified with Si-PEO (MW=400).

FIG. 20 tabularly summarizes the tintability (% L.T.), Bayer abrasion resistance, and appearance of a coating composition of MP-1154D modified with PEO and partially and fully silylated PEO on CR-39 lenses.

DETAILED DESCRIPTION OF THE INVENTION

Figure 1:
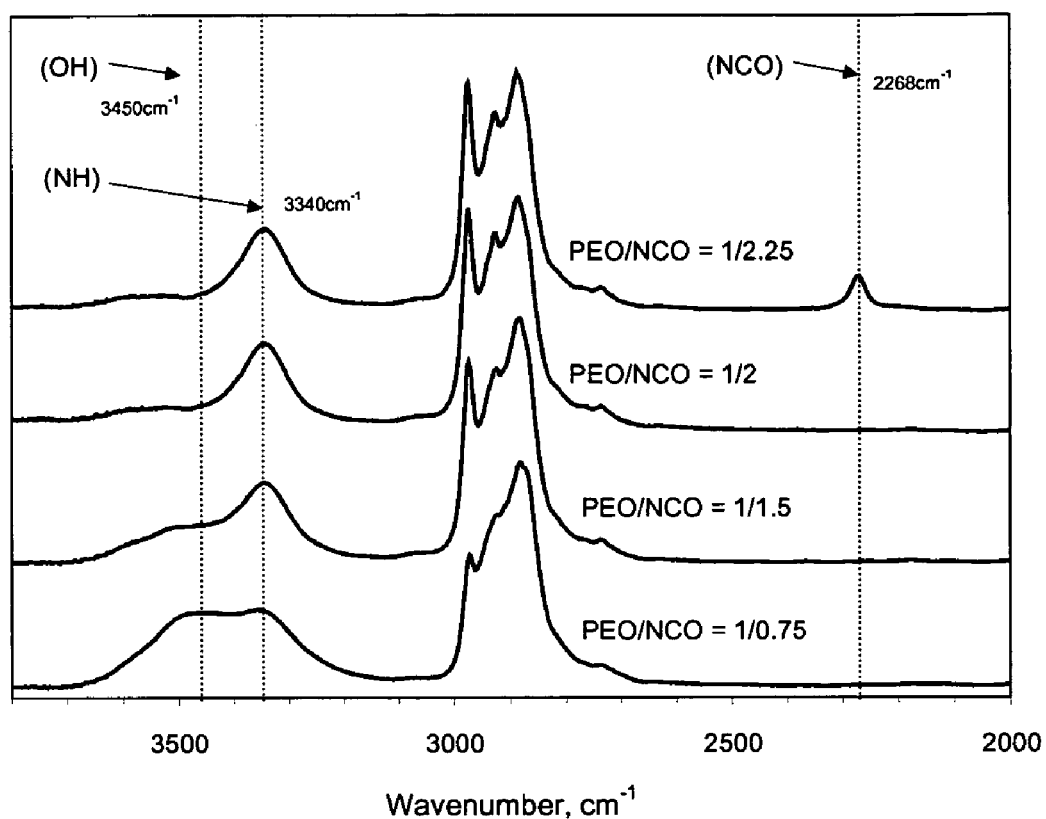
FIG. 1 graphically shows the FT-IR spectra of several reactions between Hydroxy capped polyethylene oxide (HO-PEO) and γ-isocyanatopropyltriethoxysilane (NCO) for several molar ratios. A ratio of 1/2 HO-PEO/NCO appears to completely silylate the HO-PEO.

Before explaining at least one embodiment of the invention in detail, it is to be understood that the invention is not limited in its application to the details of construction and the arrangements of the components set forth in the following description, experiments, and examples and/or illustrated in the drawings. The invention is capable of other embodiments or of being practiced or carried out in various ways. Also, it is to be understood that the phraseology and terminology employed herein is for purpose of description and should not be regarded as limiting.

The present invention relates to a tint additive for enhancing or providing tintability to substrates having substantially transparent coating compositions thereon, methods for tinting such coated substrates as well as coating compositions that include such a tint additive, and articles coated with such a coating composition containing the tint additive. More specifically, the present invention provides substantially transparent coating compositions having good abrasion resistance, refractive index matching capability, and tintability/dyeability when applied to lenses and cured. The coating compositions may be aqueous organic solvent mixtures containing effective amounts of an epoxy functional silane, tetrafunctional silanes, disilanes, a carboxylic acid component, a colloidal metal oxide component and a silane capped hydrophilic organic polymer. By way of example, but not to be considered as limiting, the coating compositions that may include the tint additive of the present invention are disclosed in U.S. Pat. Nos. 6,001,163, 6,346,331, 5,958,514, 6,348,269, 6,538,092, and 6,342,097, as well as copending applications U.S. Ser. No. 09/938,039, filed Aug. 23, 2001, and U.S. Ser. No. 10/114,569, filed Apr. 1, 2002, the contents of each of which are hereby expressly incorporated herein by reference in their entirety as though set forth herein explicitly.

The tint additive is represented by the general formula:

$$R_1-(OCH_2CH_2)_n-O-R_2 \quad (I)$$

wherein at least one of $R_1$ and $R_2$ is a silicon containing compound represented by the general formula:

$$O=\!\!\!\diagdown\!\!\!/\!\!\!\diagdown\!\!\!NH\diagdown\!\!\!\diagup\!\!\!\diagdown\!\!\!\diagup\!\!\!\diagdown\!\!\!Si(OR_3)_{3-x}(R_4)_x \quad (II)$$

where $R_3$ is H, an alkyl group containing from about 1 to about 5 carbon atoms, or an acetyl group, and where $R_4$ is H, an epoxy functional group, an alkyl group, a functional alkyl group, an alkylene group, an aryl group, an alkyl ether, and combinations thereof containing from about 1 to about 10 carbon atoms, and where X is an integer from 0 to about 3 and n is a positive integer greater than 1. Where only one of $R_1$ and $R_2$ is the silicon containing compound represented by Formula II, the other is H. For example, if only $R_1$ is the silicon containing compound, then $R_2$ would be H. On the other hand, if only $R_2$ is the silicon containing compound, then $R_1$ would be H. Preferably, both $R_1$ and $R_2$ are silicon containing compounds and even more preferably, the silicon containing compounds as represented by Formula II. Examples of such compounds are: Bis(N-(triethoxysilylpropyl))-O,O'-polyethyleneoxide urethane; Bis(N-trimethoxysilylpropyl))-O,O'-polyethyleneoxide urethane; Bis(N-dimethylhydroxysilylpropyl))-O,O'-polyethyleneoxide urethane; Bis(N-dimethoxymethylsilylpropyl))-O,O'-polyethyleneoxide urethane; Bis(N-dimethylmethoxysilylpropyl))-O,O'-polyethyleneoxide urethane; Bis(N-dimethylethoxysilylpropyl))-O—O'-polyethyleneoxide urethane; Bis(N-tributoxysilylpropyl))-O,O'-polyethyleneoxide urethane; Bis(N-dimethoxyphenylsilylpropyl))-O—O'-polyethyleneoxide urethane; Bis(N-diethoxyphenylsilylpropyl))-O—O'-polyethyleneoxide urethane; and the like.

In a particular embodiment, the tint additive is a modified polyethylene oxide ("PEO") polymer that has been sylilated. Specific examples of the tint additive used in coating compositions are hereinafter given. In general, however, the coating compositions can be broken into five general categories:

(1) Coating compositions which comprise an aqueous organic solvent mixture containing from about 10 to about 99.9 weight percent, based on the total solids of the composition, of a mixture of hydrolysis products and partial condensates of an epoxy functional silane and a tetrafunctional silane and from about 0.1 to about 30 weight percent, based on the total solids of the composition, of a multifunctional compound, selected from the group consisting of multifunctional carboxylic acids, multifunctional anhydrides and combinations thereof. The epoxy functional silane and the tetrafunctional silane are present in the aqueous organic solvent mixture in a molar ratio of from about 0.1:1 to about 5:1. The coating compositions may further include from about 0.1 to about 50 weight percent of a mixture of hydrolysis products and partial condensates of one or more silane additives, based on the total solids of the composition, and/or an amount of colloidal silica or a metal oxide or combinations thereof equivalent to from about 0.1 to about 50 weight percent solids, based on the total solids of the composition.

(2) Coating compositions which comprise an aqueous organic solvent mixture containing from about 10 to about 99.9 weight percent, based on the total solids of the composition, of a mixture of hydrolysis products and partial condensates of an epoxy functional silane, a disilane, and from about 0.01 to about 80 weight percent, based on the total weight of the composition, of a carboxylic acid functional compound selected from the group consisting of carboxylic acids, multifunctional carboxylic acids, anhydrides, and combinations thereof. The epoxy functional silane and the disilane are present in the aqueous organic solvent mixture in a molar ratio of from about 0.05:1 to about 5:1. The coating compositions may further include from about 0.1 to about 80 weight percent of a mixture of hydrolysis products and partial condensates of one or more silane additives, based on the total solids of the composition, and/or an amount of colloidal silica or a metal oxide or combinations thereof, equivalent to from about 0.1 to about 75 weight percent solids, based on the total solids of the composition.

(3) Coating compositions which comprise an aqueous organic solvent mixture containing from about 10 to about 90 weight percent, based on the total solids of the composition, of a mixture of hydrolysis products and partial condensates of an epoxy functional silane, from about 1 to about 90 weight percent, based on the total solids of the composition, of a carboxylic acid functional compound selected from the group consisting of carboxylic acids, multifunctional carboxylic acids, anhydrides, and combinations thereof, from about 1 to 90 weight percent, based on the total weight of the composition, of a metal oxide composite colloid, and from about 1 to 75 weight percent, based on the total solids of the composition, of a colloidal silica material. The coating compositions may further include from about 0.1 to about 50 weight percent of a mixture of hydrolysis products and partial condensates of one or more silane additives, based on the total solids of the composition.

(4) Coating compositions which comprise an aqueous organic solvent mixture containing from about 10 to about 90 weight percent, based on the total solids of the composition, of a mixture of hydrolysis products and partial condensates of an epoxy functional silane, from about 1 to about 90 weight percent, based on the total weight of the composition, of a carboxylic acid functional compound selected from the group consisting of carboxylic acids, multifunctional carboxylic acids, anhydrides, and combinations thereof, from about 1 to 90 weight percent, based on the total solids of the composition, of a metal oxide composite colloid, from about 1 to 75 weight percent, based on the total solids of the composition, of a colloidal silica material, and from about 1 to 75 weight percent, based on the total solids of the composition, of a tetrafunctional silane.

(5) Coating compositions which comprise an aqueous organic solvent mixture containing from about 10 to about 90 weight percent, based on the total solids of the composition, of a mixture of hydrolysis products and partial condensates of an epoxy functional silane, from about 1 to about 90 weight percent, based on the total weight of the composition, of a carboxylic acid functional compound selected from the group consisting of carboxylic acids, multifunctional carboxylic acids, anhydrides, and combinations thereof, from about 1 to 90 weight percent, based on the total solids of the composition, of a metal oxide composite colloid, and from about 1 to 75 weight percent, based on the total solids of the composition, of a disilane.

The multifunctional carboxylic acid compounds which can be employed in the formulation of the coating compositions of the present invention can be any multifunctional carboxylic acid, multifunctional anhydride and combinations thereof which are compatible with the epoxy functional silane, tetrafunctional silanes, disilanes and other described components of the coating compositions. These multifunctional acids may also be Silane-functional acids. Such acids have —Si(OR') groups that are capable of interacting with the hydrolysis products and partial condensates of the Epoxy-functional silane, the tetrafunctional silane and the disilane to provide a coating composition which, upon curing, produces a substantially transparent, abrasion resistant coating.

The carboxylic acid functional compound as used herein is understood to include multi-functional carboxylic acids as well as anhydrides which produce multifunctional carboxylic acids. The carboxylic acid functional compound is represented by the formula $R^5(COOR^6)_x$; where x is an integer of 1, 2, 3, or 4, and where $R^5$ is selected from the group consisting of H, an alkyl group, a functionalized alkyl group, an alkylene group, an aryl group, a functionalized aryl group, an alkyl ether, and combinations thereof wherein each of the alkyl group, the alkylene group, the aryl group, the functionalized alkyl group, and the alkyl ether are further characterized as containing from 1 to about 10 carbon atoms, and where $R^6$ is selected from the group consisting of H, a formyl group, a carbonyl group, or an acyl group, where the acyl group can be functionalized with an alkyl group, a functionalized alkyl group, an alkylene group, an aryl group, a functionalized aryl group, an alkyl ether, and combinations thereof wherein each of the alkyl group, the functionalized alkyl group, the alkylene group, the aryl group, the functionalized aryl group, and the alkyl ether are further characterized as containing from 1 to about 10 carbon atoms. Examples of carboxylic acids which can be employed in the preparation of the coating compositions of the present invention include acetic acid, acrylic acid, methacrylic acid, formic acid, propionic acid, butanoic acid, malic acid, aconitic acid (cis,trans), itaconic acid, succinic acid, malonic acid, glutaric acid, adipic acid, pimelic acid, suberic acid, azelaic acid, sebacic acid, cyclohexyl succinic acid, 1,3,5 benzene tricarboxylic acid, 1,2,4,5 benzene tetracarboxylic acid, 3-triethoxysilyltrethoxysilane, 1,4-cyclohexanedicarboxylic acid, 1,3-cyclohexanedicarboxylic acid, 1,1-cyclohexanediacetic acid, 1,3-cyclohexanedicarboxylic acid, 1,1-cyclohexanediacetic acid, 1,3-cycloheanediacetic acid, 1,3, 5-cyclohexanetricarboxylic acid and unsaturated dibasic acids such as fumaric acid and maleic acid and combinations thereof.

Examples of anhydrides which can be employed to produce the carboxylic acid component of the coating compositions of the present invention include the anhydrides of the above mentioned carboxylic acids such as acetic anhydride, propionic anhydride, acrylic anhydride, methacrylic anhydride and the cyclic anhydrides of the above mentioned dibasic acids such as succinic anhydride, itaconic anhydride, glutaric anhydride, trimellitic anhydride, pyromellitic anhydride, phthalic anhydride and maleic anhydride and combinations thereof.

The multifunctional carboxylic acid can also be a carboxylic acid or acid anhydride, which contains a —Si(OR') group. As described hereinabove, such materials contain reactive —Si(OR') groups which can react with the other silane components and the hydrolyzed and partially condensed products of the reaction of the silane components of the mixture. An example of such a material is 3-Triethoxysilylpropylsuccinicanhydride.

Optionally, in addition to the carboxylic acid component of the coating composition, a mineral acid such as, for example, hydrochloric acid or nitric acid, can be used as a co-hydrolysis catalyst for the hydrolysis of the silane compounds described herein.

The tetrafunctional silanes useful in the formulation of the coating compositions of the present invention are represented by the formulas $Si(OR^7)_4$ where $R^7$ is H, an alkyl group containing from 1 to about 5 carbon atoms and ethers thereof, a —$Si(OR^8)_3$ group where $R^8$ is a H, an alkyl group containing from 1 to about 5 carbon atoms and ethers thereof, or another —$Si(OR^8)_3$ group and combinations thereof. Examples of tetrafunctional silanes represented by the formula $Si(OR^7)_4$ are tetramethyl orthosilicate, tetraethyl orthosilicate, tetrapropyl orthosilicate, tetraisopropyl orthosilicate, tetrabutyl orthosilicate, tetraisobutyl orthosilicate, tetrakis(methoxyethoxy)-silane, tetrakis (methoxypropoxy) silane, tetrakis (ethoxyethoxy)-silane, tetrakis (methoxyethoxyethoxy)silane, trimethoxyethoxy-silane, dimethoxydiethoxy silane, triethoxymethoxysilane, poly(dimethoxysiloxane), poly(diethoxysiloxane), poly(dimethoxy-diethoxysiloxane), tetrakis(trimethoxysiloxy)silane, tetrakis-(triethoxysiloxy)silane, and the like. In addition to the $R^7$ and $R^8$ substituants described above for the tetrafunctional silane, $R^7$ and $R^8$ taken with oxygen ($OR^7$) and ($OR^8$) can be carboxylate groups. Examples of tetrafunctional silanes with carboxylate function-alities are silicon tetracetate, silicon tetrapropionate and silicon tetrabutyrate.

The disilane additives useful in the coating compositions of the present invention have the formula $(R^9O)_y R^{10}_{3-x} Si$—$R^{11}_y$—$SiR^{12}_{3-x}(OR^{13})_x$ where x is 0, 1, 2 or 3 and y is 0 or 1; $R^{10}$ and $R^{12}$ are selected from the group consisting of H, Cl, Br, an alkyl group containing from about 1 to 10 carbon atoms, a functionalized alkyl group, an alkylene group, an aryl group, or an alkylpolyether group and combinations thereof; $R^9$ and $R^{13}$ are selected from the group consisting of H, an alkyl group containing from about 1 to 10 carbon atoms, an acetyl group, and combinations thereof. If y is 1 then $R^{11}$ is selected from the group consisting of an alkylene group containing from about 1 to 12 carbon atoms, an alkylenepolyether containing from about 1 to 12 carbon atoms, an aryl group, an alkylene substituted aryl group, an alkylene group which may contain one or more olefins, or an oxygen or sulfur. If x=0, then $R^{10}$ and $R^{12}$ are Cl or Br; and if y=0, there is a direct silicon—silicon bond.

Examples of disilanes satisfying the above defined formula include bis(triethoxysilyl)ethane, bis(triethoxysilyl) methane, bis(trichlorosilyl)propane, bis(triethoxysilyl)ethylene, 1,3 bistriethoxysilylethane, hexaethoxydisiloxane, hexaethoxydisilane.

The metal oxide colloidal component of the present invention may consist of a single component metal oxide colloid or a complex composite metal oxide colloid consisting of more than one metal oxide component. It would be recognized by one of ordinary skill in the art that the metal oxide could be chosen to change the refractive index of the cured coating composition. For a high refractive index application, the refractive index of the colloidal metal oxide component should be sufficiently higher than the coating mixture so that the addition of effective amounts of the colloidal metal oxide component can yield a desirable refractive index for the entire coating composition. The colloidal metal oxide component may contain any combination of titania, zirconia, tin oxide, antimony oxide, iron oxide, lead oxide, and/or bismuth oxide for purposes of increasing the refractive index. The colloidal metal oxide component may also be alumina and/or silica. Examples of commercially available metal oxide colloidal materials and composite metal oxide component materials are the Suncolloid series AMT-130S, HIS-33M, HIT-30M, and HIT-32M from Nissan Chemical Industries LTD., Optolake 1130F-2 (A-8), 2130F-2(A-8), Optolake ARC-7, and Queen Titanic-11-1 from Catalyst and Chemical Industries LTD.

The colloidal silica component of the present invention can be either an aqueous or non-aqueous based material. The colloidal silica is an aqueous or non-aqueous solvent dispersion of particulate silica and the various products differ principally by particle size, silica concentration, pH, presence of stabilizing ions, solvent makeup, and the like. Colloidal silica is commercially available under a number of different tradename designations, including Nalcoag® (Nalco Chemical Co., Naperville, Ill.); Nyacol® (Nyacol Products, Inc., Ashland, Mass.); Snowtex® (Nissan Chemical Industries, LTD., Tokyo, Japan); Ludox® (DuPont Company, Wilmington, Del.); and Highlink OG® (Clariant, Charlotte, N.C.). It should be noted that substantially different product properties can be obtained through the selection of different colloidal silicas.

As mentioned hereinabove, in a preferred embodiment, the tint additive is a silylated polyethylene oxide polymer ("Si-PEO")—i.e. a polyethylene oxide polymer that is end capped on at least one "R" group with a silicon containing compound. The Si-PEO was prepared by reacting hydroxy capped polyethylene oxide (HO-PEO) and γ-isocyanatopropyltriethoxysilane (NCO) in the presence of dibutyltin dilaurate (DBTDL). Various molar ratios of the HO-PEO and NCO were used to synthesize the Si-PEO. The extent of the reaction was monitored by FT-IR, in which the disappearance of the isocyanate functional group was observed. According to the FT-IR data as shown in FIG. 1, a PEO/NCO ratio of 1/2 completely silylates the HO-PEO. Generally, this silylation reaction of HO-PEO with NCO can be expressed as follows:

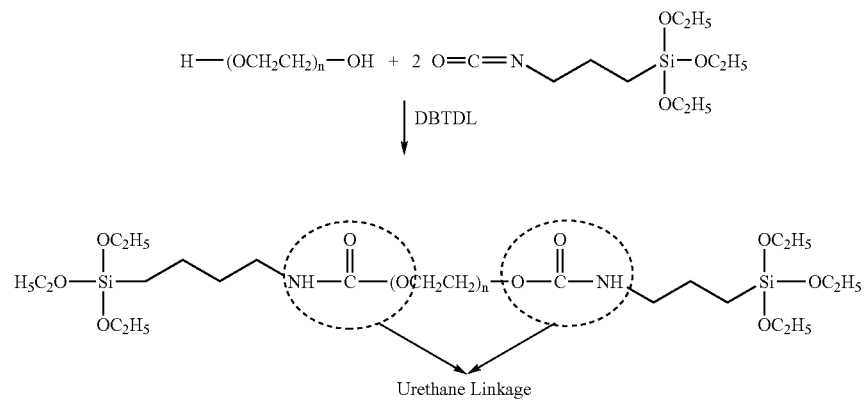

Preparation of a Coating Composition Containing Si-PEO Having a Molecular Weight of 300.

Figure 3:
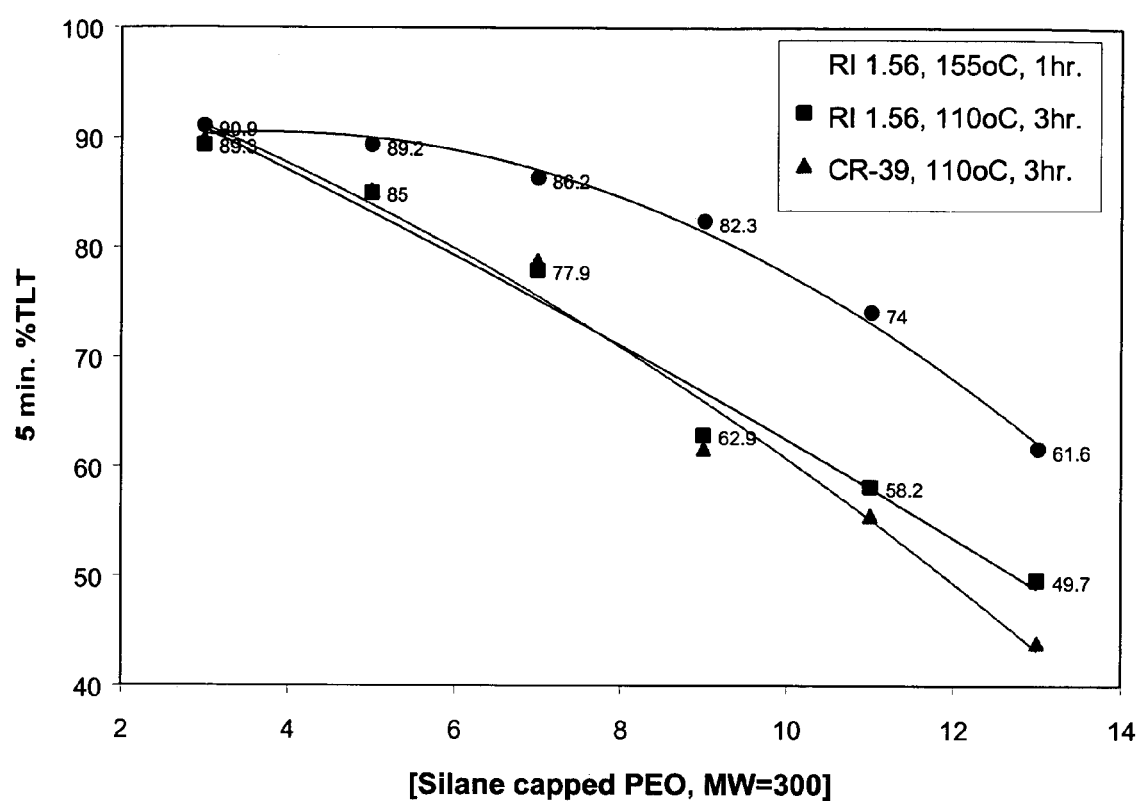
FIG. 3 graphically shows the 5 minute percent light transmission of coating composition MP-1154D (SDC Technologies, Inc.) modified with Si-PEO having a molecular weight of 300 coated on both CR.39 and RI 1.56 lenses.
Figure 4:
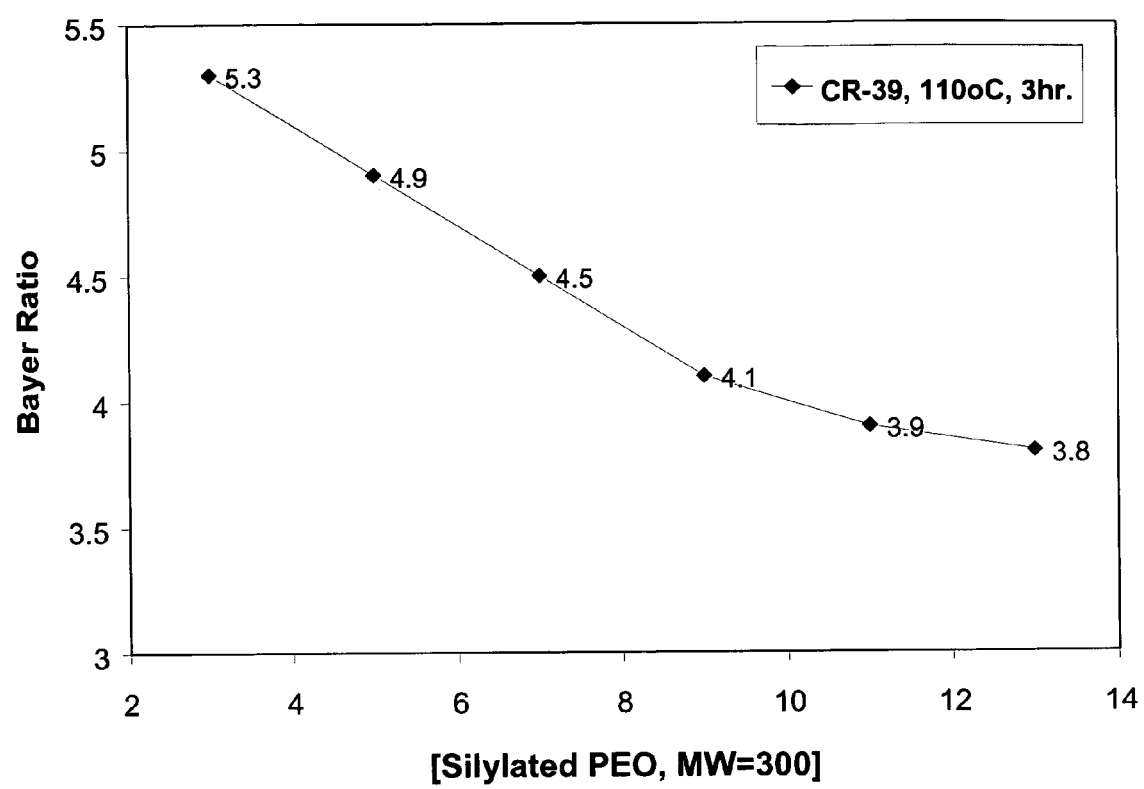
FIG. 4 graphically shows the Bayer abrasion ratio of coating composition MP-1154D modified with Si-PEO having a molecular weight of 300 as a function of Si-PEO concentration.

A commercially available hard coating MP-1154D from SDC Technologies, Inc. (i.e. a coating composition corresponding to the coating composition (1) hereinabove described) was used. Using the MP-1154D hard coating, several tintable coatings were prepared by the addition of the Si-PEO having a molecular weight of 300. For example, when 100 parts of the MP-1154D hard coat composition were used, a range from about 3 to about 13 parts of Si-PEO were included to thereby provide a tintable abrasion resistant coating. CR-39 and 1.56 lenses were dipcoated at a withdrawal rate of 3 inches per minute, and thermally cured at 155° C. for 1 hour, or alternately, at 110° C. for 3 hours. After the lenses were cured, they were tinted in BPI black solution at 95° C. It was found that tintability of the coating lenses increased as a function of the concentration of the Si-PEO. Lens samples cured at a lower temperature (110° C.) showed higher tintability as is shown in FIG. 2. The percent light transmission profiles (% LT) for 5 minutes, as well as Bayer ratio, is shown in FIG. 3 and the Bayer ratio is shown in FIG. 4, both as a function of Si-PEO concentration.

Preparation of a Coating Composition Containing Si-PEO Having a Moelcular Weight of 400.

Figure 5:
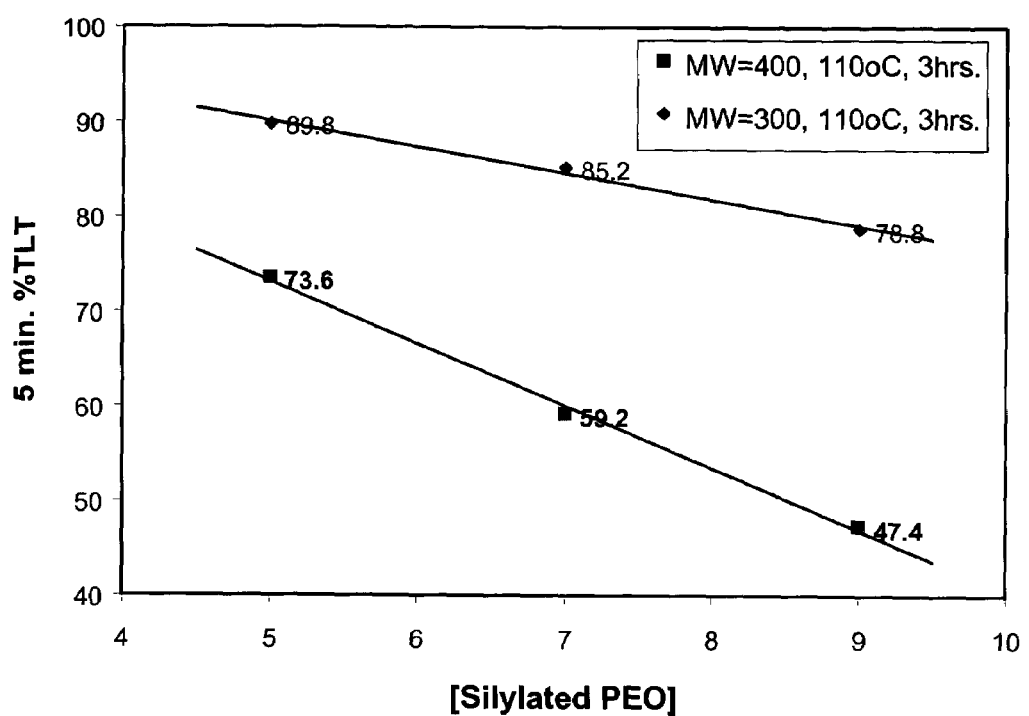
FIG. 5 graphically shows the percent light transmission of coating composition MP-1154D modified with Si-PEO (MW-300) versus coating composition MP-1154D modified with Si-PEO (MW400).
Figure 6:
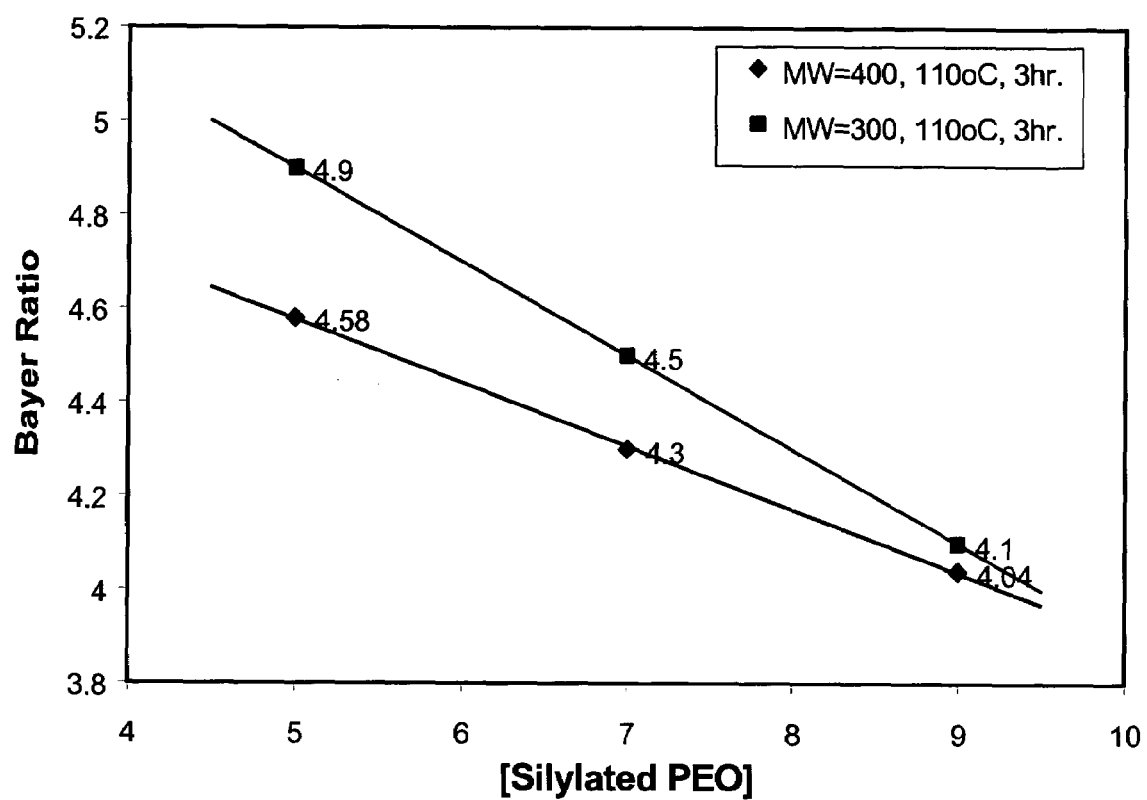
FIG. 6 graphically compares the Bayer abrasion resistance ratio of CR-39 lenses having a coating composition MP-1154D modified with Si-PEO (MW=300 and 400) applied thereon.
Figure 8:
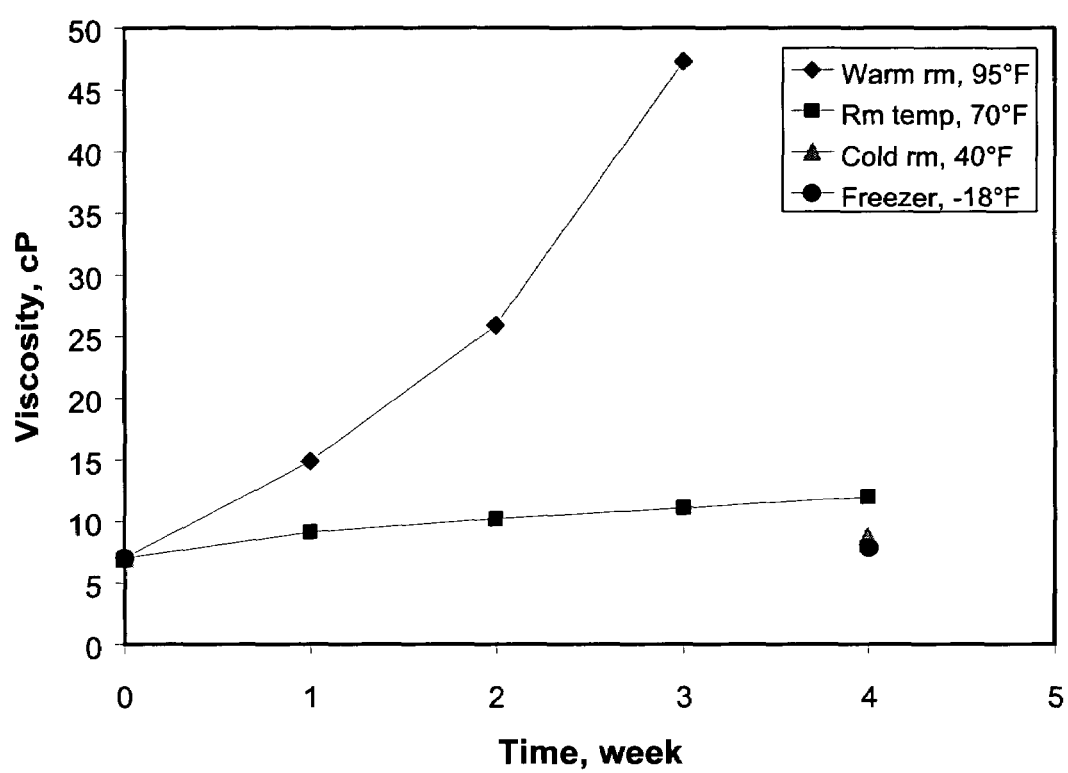
FIG. 8 graphically shows aging data for a coating composition of the present invention having a pH of 4.55.
Figure 9:
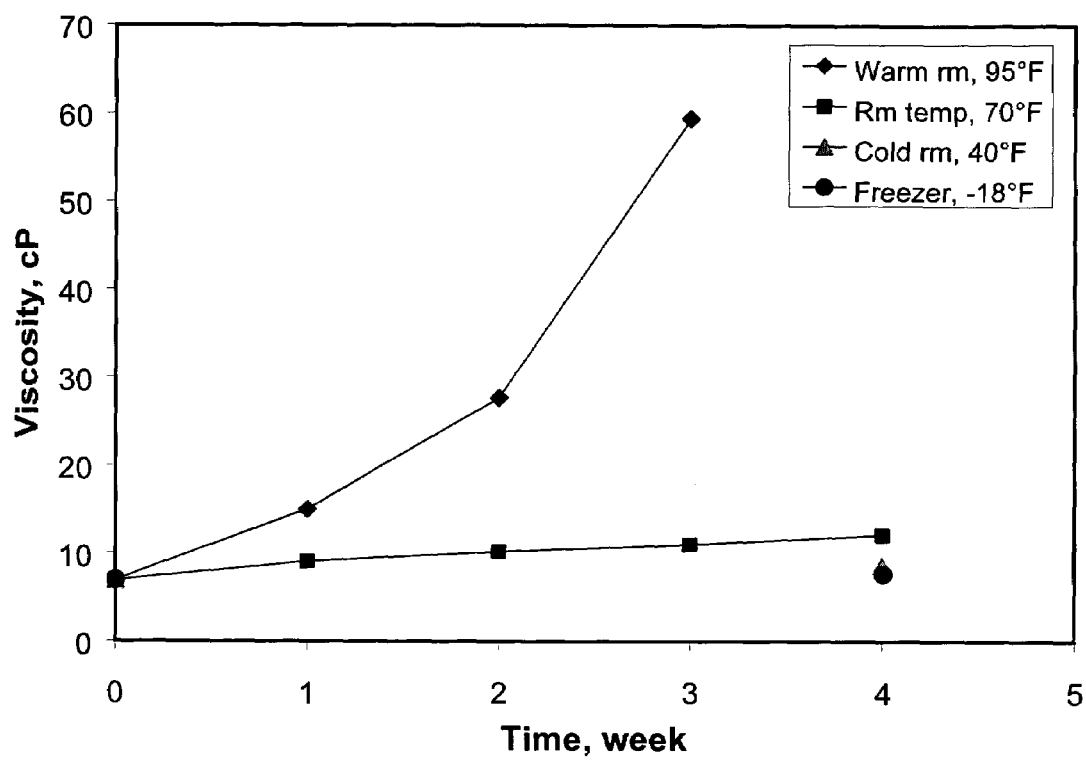
FIG. 9 graphically shows aging data for a coating composition of the present invention having a pH of 4.67.
Figure 10:
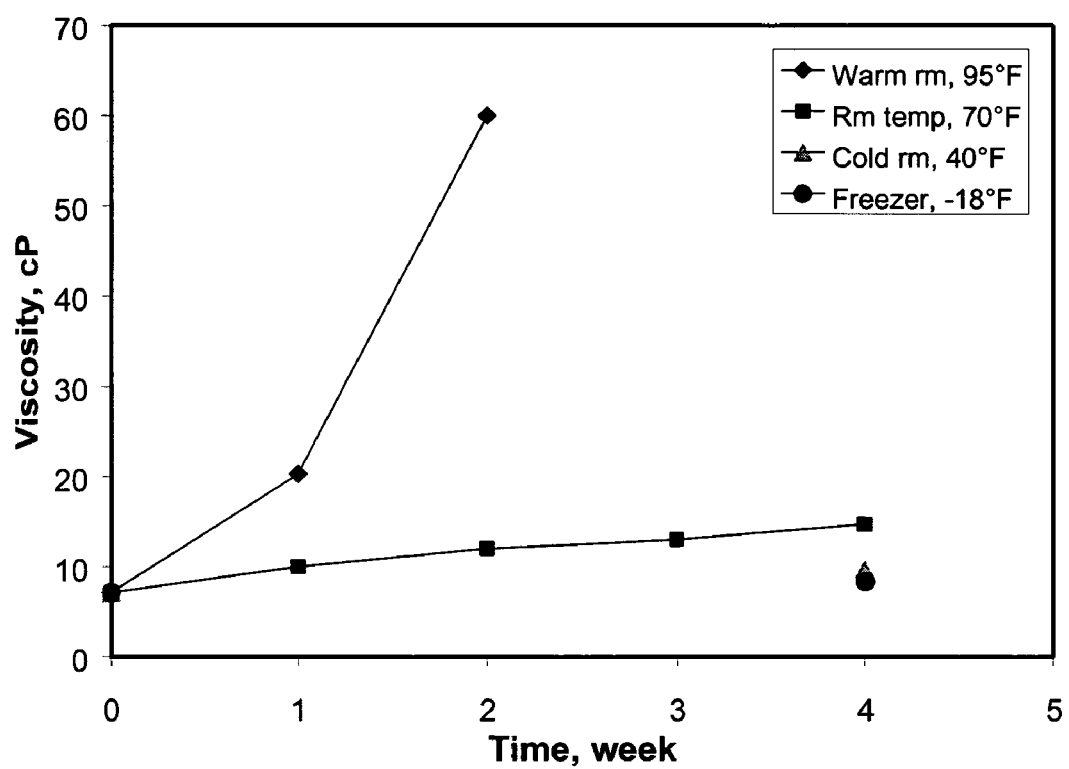
FIG. 10 graphically shows aging data for a coating composition of the present invention having a pH of 4.74.
Figure 11:
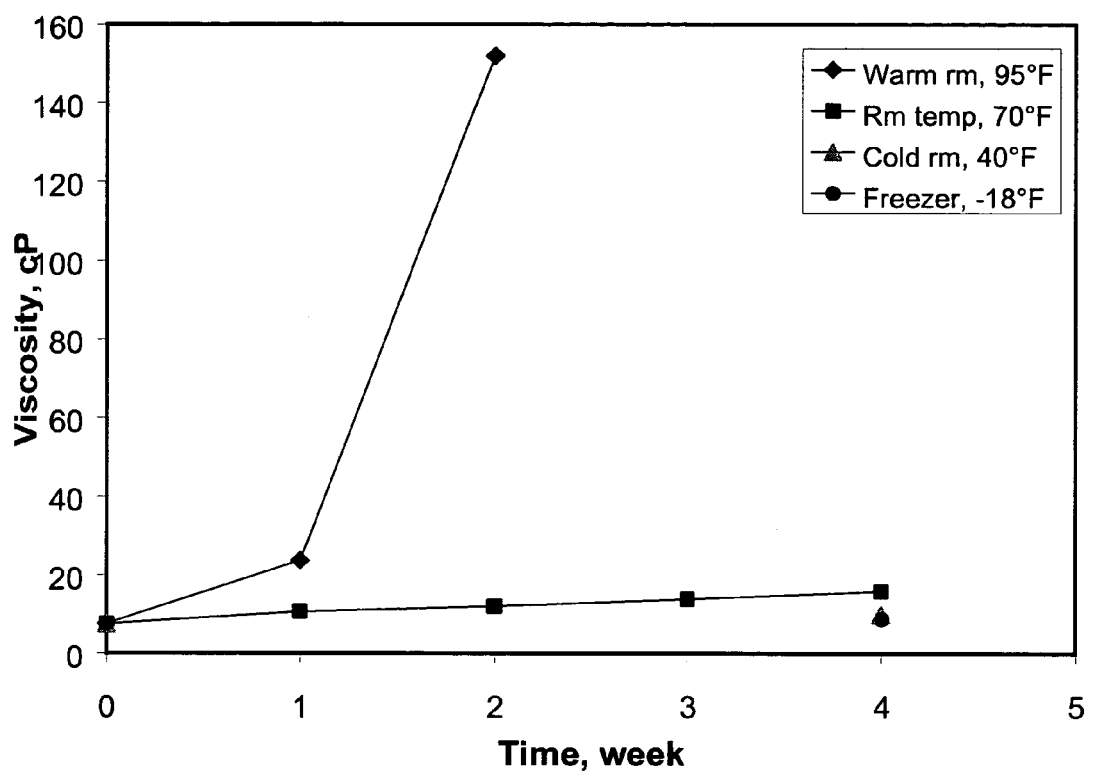
FIG. 11 graphically shows aging data for a coating composition of the present invention having a pH of 4.82.

Coating compositions of MP-1154D and various concentrations of Si-PEO having a molecular weight of 400 were also prepared. Comparison of the tintability data for the coating compositions having Si-PEO (MW 300) versus Si-PEO (MW 400) showed that tintability of the coating compositions increased as a function of the MW of the Si-PEO (FIG. 5, also, see FIGS. 2 & 3). The Bayer ratio decreased as a function of Si-PEO concentration (FIG. 6).

Overall, higher abrasion resistance (as measured as a Bayer ratio) was observed for the coating composition modified with Si-PEO having the lower molecular weight (i.e. MW=300).

A coating composition containing 9% Si-PEO (MW=400) was also coated on polycarbonate lenses, both with and without primers (FIG. 7). Suitable primers for use include those disclosed in U.S. Pat. No. 5,316,791, the entire contents of which are incorporated herein by reference in their entirety. Generally, polycarbonate, as opposed to CR-39 or other cast lenses which inherently have some nominal tintability, is a non-tintable substrate. Therefore, in order to provide for the tintability of polycarbonate lenses, a tintable coating or tintable primer with a tint-permeable coating is required. The coating composition modified with the Si-PEO of the present invention provides tintability to a polycarbonate lens, as shown by the decrease in % LT, shown in FIG. 7.

The effect of pH on various properties of the coating compositions of the present invention was investigated by keeping the colloidal silica concentration of the coating composition constant, but varying the pH of the coating composition. Formulations of coating compositions containing various ratios of high pH silica HS-30 (Dupont) and lower pH silica Ludox LS (Dupont) were prepared. Coating composition formulations having pH values of 4.55, 4.67, 4.74 and 4.82 were evaluated. The coating composition solutions were stored at −18° F., 40° F., 70° F. and 95° F., and the viscosities of the coating compositions were measured periodically using a Brookfield viscometer (Data shown in FIGS. 8, 9, 10, 11). The abrasion resistance as measured as a Bayer ratio and the tintability of the coating compositions modified with Si-PEO of the present invention (in terms of 30 min % TLT) were also measured and the results are tabulated in FIG. 12. Higher pH values adversely affected the stability of the coating composition as evidenced by large viscosity increases at 95° F. as a function of pH. Bayer ratio and tintability appeared to be affected minimally by the pH variation.

A refractive index coating compositon (i.e. IM-1203 1.58 commercially available from SDC Technologies, Inc.) (i.e. coating compositions primarily corresponding to coating compositions 3, 4 or 5 hereinabove) was also modified with Si-PEO to provide an alternative embodiment of the coating composition of the present invention. Several tintable versions of this refractive index coating composition modified with Si-PEO (MW=400) were prepared. For 100 parts of the refractive index coating composition (i.e. IM-1203), a range from about 4 to about 9 parts of Si-PEO (MW=400) were used to prepare the tintable refractive index coating compositioin modified with Si-PEO (MW=400) of the present invention.

Figure 13:
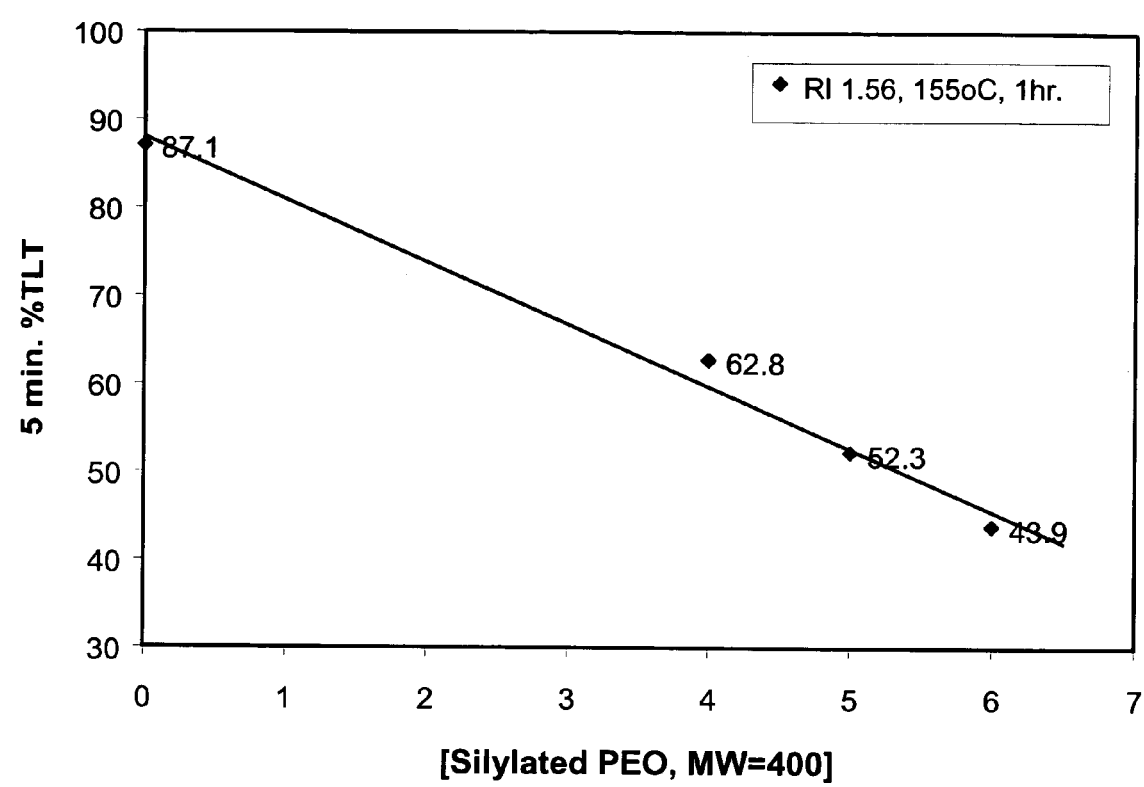
FIG. 13 graphically shows the tintability (5 min. % LT) of RI 1.56 lenses coated with a refractive index coating composition of IM-1203 (SDC Technologies, Inc.) modified with Si-PEO (MW=400).
Figure 14:
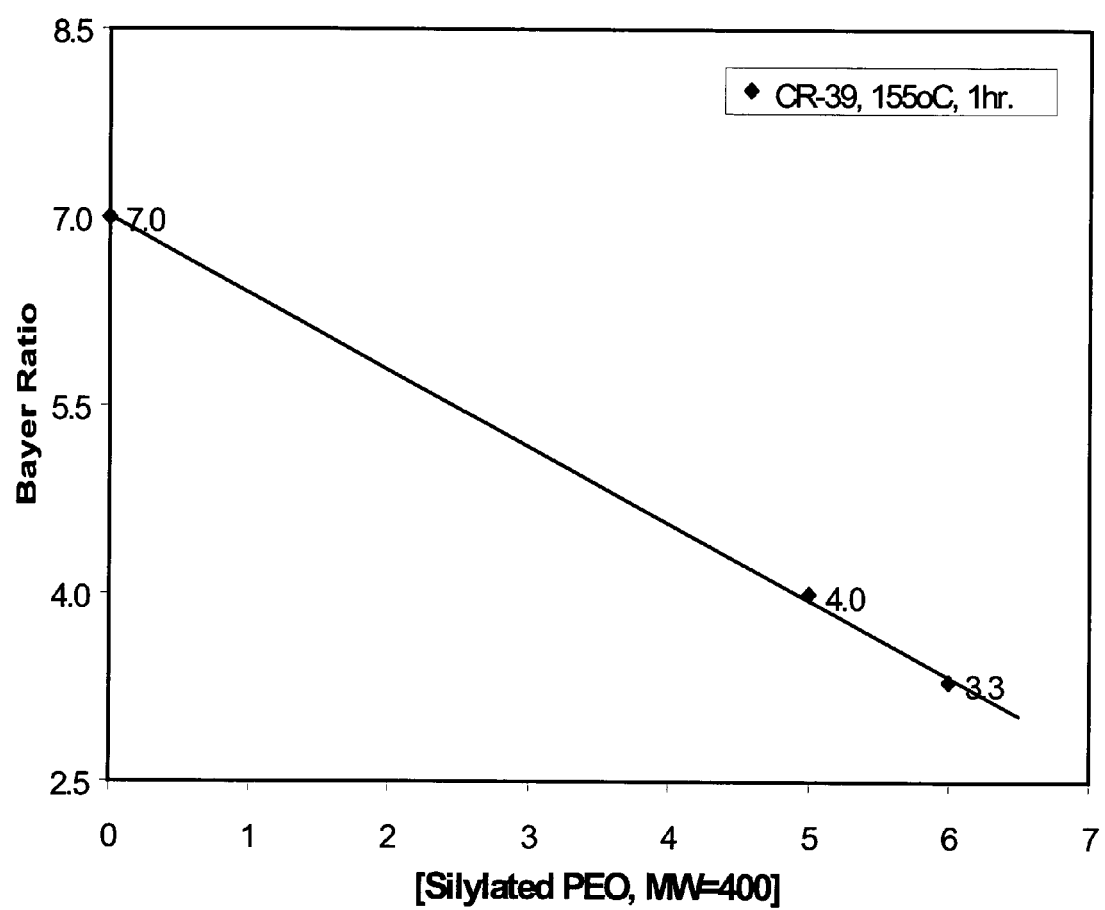
FIG. 14 graphically shows the Bayer abrasion resistance of CR-39 lenses coated with a refractive index coating composition of IM-1203 modified with Si-PEO (MW=400).

Refractive index coating compositions modified with Si-PEO (MW=400) were coated on R.I.1.56 lenses and cured at 155° C. for 1 hour. As shown in FIG. 13, such coating compositions had good tintability. CR-39 lenses coated with the refractive index coating composition (IM-1203) modified with Si-PEO and cured at 110° C. for 1 hour showed good tintability as well as initial & post-tint adhesion. The abrasion resistance of the refractive index coating composition (IM-1203) modified with Si-PEO (i.e. the Bayer ratio) decreased as a function of Si-PEO concentration as shown in FIG. 14. The results of tintability (% LT) and abrasion resistance (Bayer ratio) are tabularly shown in FIG. 15 for refractive index coating compositons (IM-1203) modified and unmodified with Si-PEO. As seen in FIG. 15, the refractive index coating composition modified with Si-PEO had better tintability but lower abrasion resistance than the refractive index coating composition without the Si-PEO.

Test Methods

For testing adhesion of the coated articles the procedures of ASTM D-3359, i.e. the tape test, were followed.

For measuring tintability, the test used consisted of exposing the coated article (i.e. lens having the coating composition modified Si-PEO coated and cured thereon) to BPI Black Tint (Brain Power, Inc.) at a temperature range of from 90° C. to 100° C. In this test, a bottle of BPI tint (approximately 100 grams) was diluted to about 900 grams with DI water and brought to 96° C. The coated article was immersed in the heated solution for a specified period of time. The coated article was removed from the tint solution and the light transmittance was measured using a BYK Gardner Haze-gard Plus hazemeter.

For testing the Bayer abrasion resistance (Bayer ratio) of coated substrates, a commercially available alundum (grain code 1524, 12 grit, alundum ZF) sold by Norton Advanced Ceramics of Canada, Inc., 8001 Daly Street, Niagara Falls, Ontario, was used as the abrasive material. In this test, 540 grams alumdum was loaded into a 9⁵⁄₁₆"×6¾" cradle fitted with four lenses. Each set of four lenses, typically two polycarbonate (diethylene glycol-bis-allyl) standardized lenses, herein referred to as ADC lenses, and two coated lenses, were subjected to a 4 inch stroke (the direction of the stroke coinciding with the 9⁵⁄₁₆" length of the cradle) at an oscillation frequency of 300 strokes per minute for a total of 4 minutes. The lens cradle was repositioned by turning it 180 degrees after the initial 2 minutes of oscillations. Repositioning of the cradle was used to reduce the impact of any inconsistencies in the oscillating mechanism. The ADC reference lenses used were Silor 70 mm plano FSV lenses, purchased through Essilor of America, Inc. of St. Petersburg, Fla.

The above described procedure is slightly modified from that which is described by the AR Council of America by increasing the weight of the alundum to accommodate the increased surface area of the larger cradle. The cradle described above holds 4 lenses. The haze generated on the lenses was then measured on a BYK Gardner Haze-gard Plus hazemeter. The haze gain for each lens was determined as the difference between the initial haze on the lenses and the haze after testing. The ratio of the haze gain on the ADC reference lenses to the haze gain on the coated sample lenses was then reported as the resultant abrasion resistance of the coating material. A ratio of greater than 1 indicates a coating which provides greater abrasion resistance than the uncoated ADC reference lenses. The ratio is commonly referred to as the Bayer ratio, number or value. Coatings with high abrasion resistance possess larger Bayer numbers than coatings with lower abrasion resistance.

EXAMPLES

Procedures

A. Polycarbonate lenses were primed with a commercially available primer PR-1165 from SDC Technologies, Inc. prior to coating application. The primed lenses were coated by dip coating using a specified withdrawal rate in units of inches per minute (ipm) and cured at 129° C. for 75 minutes unless specified otherwise. The lenses were subjected to test procedures to determine tintability and abrasion resistance.

B. The 1.56 R.I. (refractive index) lenses were cleaned by etching in 10 percent KOH containing 1:1 mixture of propylene glycol methyl ether and water, followed by rinsing with water. The coating was applied to the 1.56 R.I. lenses by dipping at a specific withdrawal rate in units of inches per minute (ipm), followed by curing for 1 hour at 155° C. The lenses were subjected to test procedures to determine tintability and abrasion resistance.

C. Etched ADC lenses were used for coating and testing. The ADC lenses were etched by contact with a 10% KOH solution containing 1:1 mixture of propylene glycol methyl ether and water for a period of about 10 minutes. The lenses were coated by dip coating using a specified withdrawal rate in units of inches per minute (ipm). The lenses were cured at a temperature of 110° C. for 3 hours. The lenses were subjected to test procedures to determine tintability and abrasion resistance.

Example 1A 30 grams of HO-PEO (MW=300) and 49.2 grams of NCO were mixed in a round bottom flask and heated to 70° C. using an oil bath and a condenser while stirring. 0.12 grams of dibutyltin dilaurate catalyst were added drop by drop. The extent of reaction was monitored by FT-IR.

Example 1B 30 grams of HO-PEO (MW=300) and 36.9 grams of NCO were mixed in a round bottom flask and heated to 70° C. using an oil bath and a condenser while stirring. 0.092 grams of dibutyltin dilaurate catalyst were added drop by drop. The extent of reaction was monitored by FT-IR.

Example 2A 5.6 grams of the material described in example 1A above were added to 181.3 grams of a commercially available hard coating MP-1154D from SDC Technologies, Inc., and stirred overnight to yield a coating composition.

The coating composition was applied to etched ADC lenses according to Procedure C to provide a coating having a thickness of about 3.5 microns with a withdrawal rate of 3 ipm, a Bayer number of 5.3 and 20 minute tintability of 69.6 percent L.T.

Example 2B 9.6 grams of the material described in example 1A above were added to 181.3 grams of a commercially available hard coating MP-1154D from SDC Technologies, Inc., and stirred overnight to yield a coating composition.

The coating composition was applied to etched ADC lenses according to Procedure C to provide a coating having a Bayer number of 4.9 and 20 minute tintability of 59.5 percent L.T.

Example 2C 13.7 grams of the material described in example 1A above were added to 181.3 grams of a commercially available hard coating MP-1154D from SDC Technologies, Inc., and stirred overnight to yield a coating composition.

The coating composition was applied to etched ADC lenses according to Procedure C to provide a coating having a Bayer number of 4.5 and 20 minute tintability of 44 percent L.T.

Example 2D 16.2 grams of the material described in example 1A above were added to 163.8 grams of a commercially available hard coating MP-1154D from SDC Technologies, Inc., and stirred overnight to yield a coating composition.

The coating composition was applied to etched ADC lenses according to Procedure C to provide a coating having a Bayer number of 4.1 and 15 minute tintability of 26.05 percent L.T.

Example 2E 9 grams of the material described in example 1B above were added to 171 grams of a commercially available hard coating MP-1154D from SDC Technologies, Inc., and stirred overnight to yield a coating composition.

The coating composition was applied to etched ADC lenses according to Procedure C to provide a coating having a Bayer number of 4.6 and 10 minute tintability of 53.5 percent L.T.

Example 2F 12.6 grams of the material described in example 1B above were added to 167.4 grams of a commercially available hard coating MP-1154D from SDC Technologies, Inc., and stirred overnight to yield a coating composition.

The coating composition was applied to etched ADC lenses according to Procedure C to provide a coating having a Bayer number of 4.3 and 10 minute tintability of 38 percent L.T.

Example 2G 16.2 grams of the material described in example 1A above were added to 163.8 grams of a commercially available hard coating MP-1154D from SDC Technologies, Inc., and stirred overnight to yield a coating composition.

The coating composition was applied to etched ADC lenses according to Procedure C to provide a coating having a Bayer number of 5.3 and 10 minute tintability of 28.5 percent L.T.

Example 3A 79.8 grams of Si-PEO (MW=400) were added to a stirring solution of 1222 grams of a commercially available hard coating MP-1154D from SDC Technologies, Inc. The mixture was stirred overnight. 198.2 grams of propylene glycol methyl ether (PMOH) were added to yield a coating composition having a pH of 4.82.

The coating composition was applied to polycarbonate lenses primed according to Procedure A to provide a coating having a thickness of about 4.1 microns with a withdrawal rate of 10 ipm, a Bayer number of 3.7, and 30 minute tintability of 25.8 percent L.T.

Example 3B 2.7 grams of itaconic acid were dissolved in 246.7 grams of water, and subsequently 117.7 grams of Ludox LS (Dupont) was added while stirring. 198.9 grams of 3-glycidoxypropyltrimethoxysilane (GPTMS) were added slowly to the mixture and stirred for 1.5 hours. 24.6 grams of itaconic acid pre-dissolved in 422.8 grams of PMOH were added to the mixture. 285.7 grams of tetraethyl orthosilicate were added slowly to the mixture and stirred overnight. 0.98 grams of PA-57 (Dow Corning), 10 weight percent in PMOH, were added, then 83 grams of Si-PEO were added and stirred overnight. 176 grams of PMOH was added to yield a coating composition having a pH of 4.55.

The coating composition was applied to polycarbonate lenses primed according to Procedure A to provide a coating having a thickness of about 4.2 microns with a withdrawal rate of 10 ipm, a Bayer number of 3.8, and 30 minute tintability of 24.3 percent L.T.

Example 3C 480 grams of the coating composition, described in Example 3A above, were added to 240 grams of the coating composition, described in Example 3B, and stirred to yield a coating composition having a pH of 4.67.

The coating composition was applied to polycarbonate lenses primed according to Procedure A to provide a coating having a thickness of about 4.4 microns with a withdrawal rate of 10 ipm, a Bayer number of 4, and 30 minute tintability of 22.4 percent L.T.

Example 3D

½=HS30/LS 240 grams of the coating composition, described in Example 3A above, were added to 480 grams of the coating composition, described in Example 3B, and stirred to yield a coating composition having a pH of 4.74.

The coating composition was applied to polycarbonate lenses primed according to Procedure A to provide a coating having a thickness of about 4.1 microns with a withdrawal rate of 10 ipm, a Bayer number of 3.7, and 30 minute tintability of 26.8 percent L.T.

Example 4

1.4 grams of itaconic acid were dissolved in 128.7 grams of water, and subsequently 61.4 grams of Ludox LS was added while stirring. 128.7 grams of GPTMS were added slowly to the mixture and stirred for 1.5 hours. 12.8 grams of itaconic acid pre-dissolved in 388.2 grams of PMOH were added to the mixture, then 43.3 grams of silylated PEO were added and stirred for 1.5 hours. 149 grams of tetraethyl orthosilicate were added slowly to the mixture and stirred overnight. 11.43 grams of PA-57 (Dow Corning), 10 weight percent in PMOH, were added to yield a coating composition.

The coating composition was applied to polycarbonate lenses primed according to Procedure A to provide a coating having a thickness of about 3 microns with a withdrawal rate of 10 ipm, a Bayer number of 2, and 30 minute tintability of 12 percent L.T.

Example 5

10.8 grams of Si-PEO (MW=400) were added to a stirring solution of 169.2 grams of a commercially available hard coating IM-1203 1.58RI from SDC Technologies, Inc. The mixture was stirred overnight.

The coating composition was applied to etched ADC lenses according to Procedure C to provide a coating having a thickness of about 3 microns with a withdrawal rate of 3 ipm, a Bayer number of 3.3.

The coating composition was applied to 1.56 R.I. lenses according to Procedure B to provide a coating having a 5 minute tintability of 43.9 percent L.T.

Example 6

19.2 grams of Si-PEO (MW=400) were added to a stirring solution of 300.8 grams of a commercially available hard coating IM-1186 from SDC Technologies, Inc. The mixture was stirred overnight. 38.9 grams of Isopropyl alcohol(IPA) were added to yield a coating composition.

The coating composition was applied to etched ADC lenses according to Procedure C to provide a coating having a thickness of about 3.5 microns with a withdrawal rate of 10 ipm, a Bayer number of 3.6.

The coating composition was applied to 1.56 R.I. lenses according to Procedure B to provide a coating having a 30 minute tintability of 51.2 percent L.T.

The comparison of tintability data in FIG. 16 for coating composition IM-1186 unmodified with Si-PEO and coating composition IM-1186 modified with Si-PEO (MW=400) shows that substantial improvement in tintability occurs (% L.T.) for the coating composition modified with Si-PEO (MW=400) after 30 minutes of tinting.

Example 7

10.8 grams of Si-PEO (MW=400) were added to a stirring solution of 169.2 grams of a commercially available hard coating PF-1202 from SDC Technologies, Inc. The mixture was stirred overnight to yield a coating composition.

The coating composition was applied to bare polycarbonate lenses and cured at 129° C. for 3 hours to provide a coating having a thickness of about 4.3 microns with a withdrawal rate of 10 ipm, a Bayer number of 3.1, and 30 minute tintability of 42.6 percent L.T.

The comparison of tintability data as shown in FIG. 17 for the coating composition modified with Si-PEO PF-1202 (MW=400) and unmodifed shows that the coating composition (PF-1202) modified with Si-PEO (MW=400) has increased tintability (% L.T.).

Example 8

9 grams of Si-PEO (MW=400) were added to a stirring solution of 171 grams of a commercially available hard coating MP-2010 from SDC Technologies, Inc. The mixture was stirred overnight to yield a coating composition.

The coating composition was applied to etched ADC lenses according to Procedure C to provide a coating having a thickness of about 5 microns with a withdrawal rate of 10 ipm, a Bayer number of 3, and 5 minute tintability of 60.7 percent L.T.

MP-2010 without silylated PEO was applied to etched ADC lenses according to Procedure C to provide a coating having a 5 minute tintability of 80 percent L.T.

Examples of Fully Silylated PEO and Partially Silylated PEO

Figure 18:
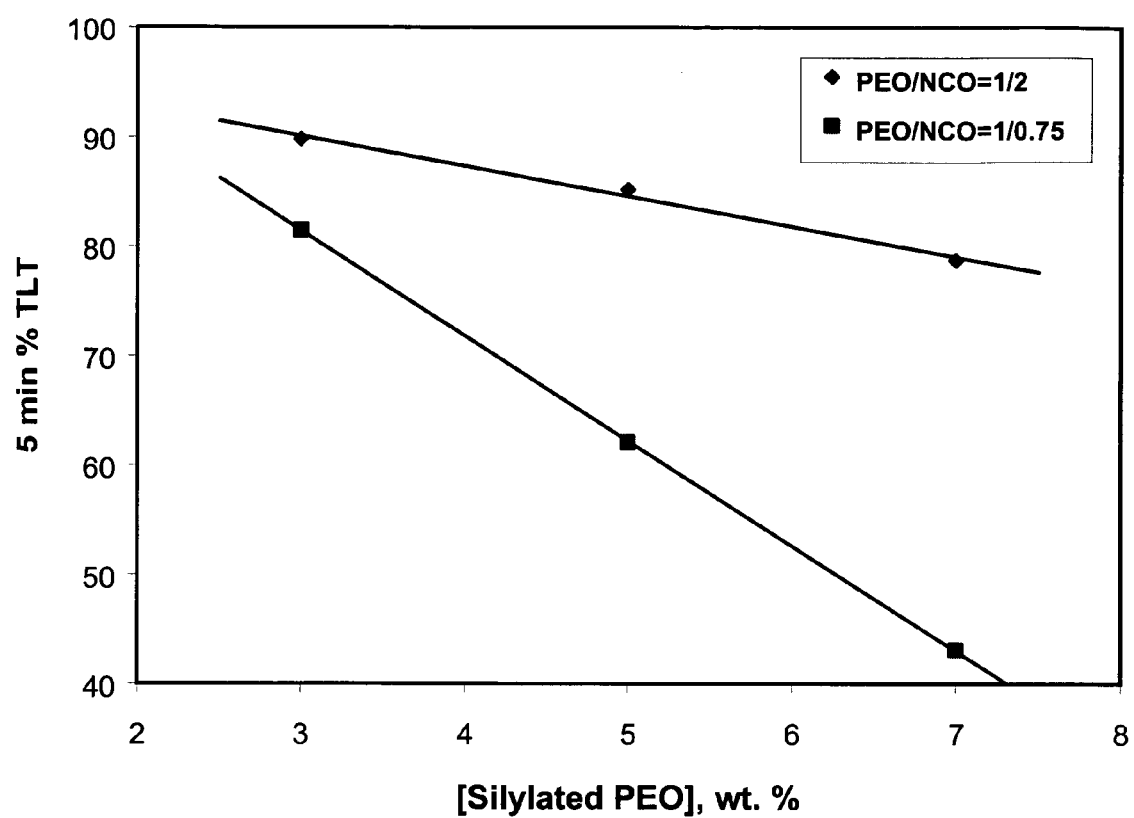
FIG. 18 graphically shows the tintability (% L.T.) of a coating composition of MP-1154D modified with partially and fully silylated PEO on CR-39 lenses.
Figure 19:
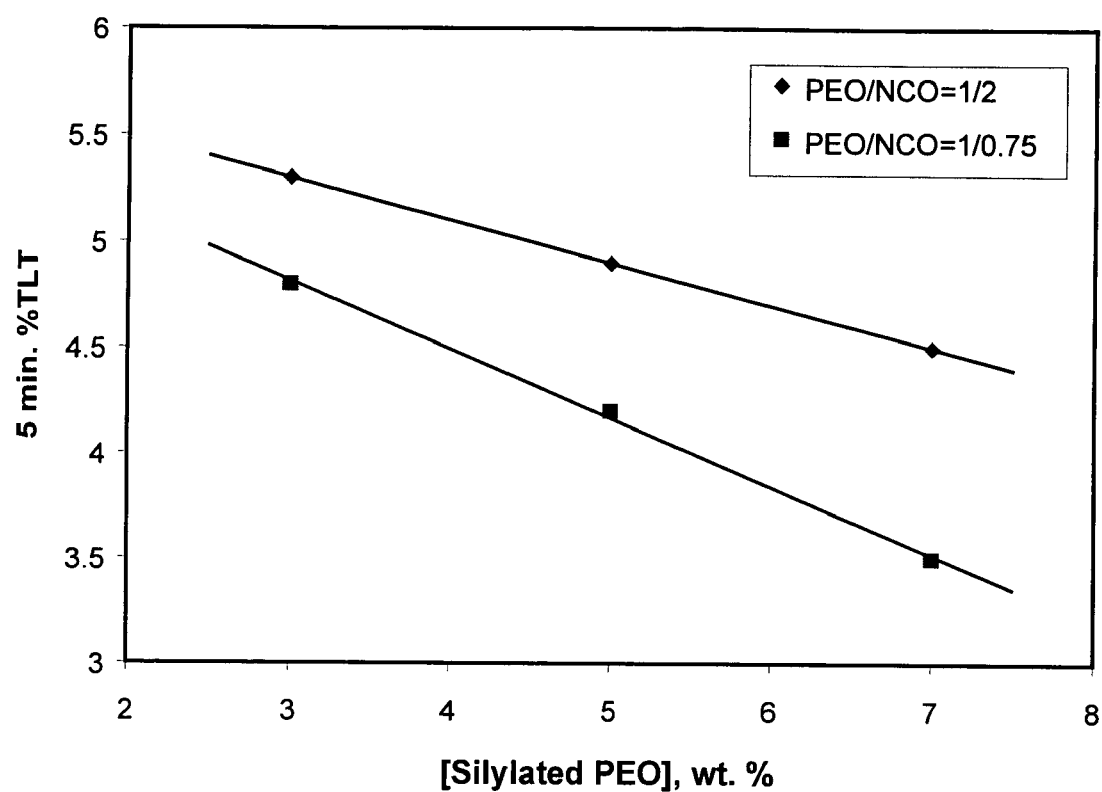
FIG. 19 graphically shows the Bayer abrasion resistance of a coating composition of MP-1154D modified with partially and fully silylated PEO on CR-39 lenses.

The degree of silylation can be controlled by the molar ratio between PEO and NCO. For PEO/NCO=1/2, 100% silylation of PEO is likely to occur, whereas for PEO/NCO=1/0.75, only partial silylation of PEO is expected to occur. Silylated PEO with PEO/NCO=1/0.75 and PEO/NCO=1/2 were prepared by reacting PEO (MW=400) and NCO as described hereinabove. Coating compositions based on commercially available hard coating MP-114D from SDC Technologies, Inc., modified wtih various concentrations of fully silylated PEO and partially silylated PEO were prepared. Partially silylated PEO generally provided greater tintability as indicated by lower % LT after 5 minutes of tinting (FIG. 18). Increased abrasion resistance (Bayer ratio) was observed for coating compositions (MP-1154D) modified with fully silylated PEO, however (FIG. 19).

For purposes of comparison, a commercially available hardcoating MP-1154D from SDC Technologies, Inc. was used to prepare a coating composition modified with an unsilylated PEO, i.e.—5 wt. % PEO (MW=400) was added to MP-1154D. ADC lenses were dipcoated and cured at 110° C. for 3 hours. Tintability, post-tint appearance and Bayer abrasion resistance were evaluated. The coating formulation containing PEO showed faster tintability, but lower Bayer ratio than those containing partially or fully silylated PEO (FIG. 20). The post-tint appearance also showed streaks and a higher degree of unevenness on the surface.

Although the foregoing invention has been described in some detail by way of illustration and example for purposes of clarity of understanding, it will be obvious to those skilled in the art that certain changes and modifications may be practiced without departing from the spirit and scope thereof; as described in this specification and as defined in the appended claims below.

The invention claimed is:

1. A coating composition that is capable of being tinted after application to a substrate, comprising:

a tint additive represented by the formula:

$R_1-(OCH_2CH_2)_n-O-R_2$ wherein at least one of $R_1$ and $R_2$ is silane containing group represented by the formula:

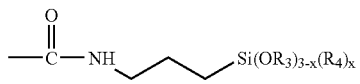

where $R_3$ is H, an alkyl group containing from about 1 to about 5 carbon atoms, or an acetyl group, and where $R_4$ is H, an epoxy functional group, an alkyl group, a functional alkyl group, an alkylene group, an aryl group, an alkyl ether, and combinations thereof containing from about 1 to about 10 carbon atoms, where X is an integer from 0 to about 3 and n is a positive integer, and where only one of $R_1$ or $R_2$ is the silane containing group, $R_1$ or $R_2$ is H; and a base compound selected from the group of base compounds consisting of:

(1) an aqueous organic solvent mixture containing from about 10 to about 99.9 weight percent, based on the total solids of the composition, of a mixture of hydrolysis products and partial condensates of an epoxy functional silane and a tetrafunctional silane and from about 0.1 to about 30 weight percent, based on the total solids of the composition, of a multifunctional compound, selected from the group consisting of multifunctional carboxylic acids, multifunctional anhydrides and combinations thereof, the epoxy functional silane and the tetrafunctional silane are present in the aqueous organic solvent mixture in a molar ratio of from about 0.1:1 to about 5:1, the coating compositions may further include from about 0.1 to about 50 weight percent of a mixture of hydrolysis products and partial condensates of one or more silane additives, based on the total solids of the composition, and/or an amount of colloidal silica or a metal oxide or combinations thereof equivalent to from about 0.1 to about 50 weight percent solids, based on the total solids of the composition;

(2) an aqueous organic solvent mixture containing from about 10 to about 99.9 weight percent, based on the total solids of the composition, of a mixture of hydrolysis products and partial condensates of an epoxy functional silane, a disilane, and from about 0.01 to about 80 weight percent, based on the total weight of the composition, of a carboxylic acid functional compound selected from the group consisting of carboxylic acids, multifunctional carboxylic acids, anhydrides, and combinations thereof, the epoxy functional silane and the disilane are present in the aqueous organic solvent mixture in a molar ratio of from about 0.05:1 to about 5:1, the coating compositions may further include from about 0.1 to about 80 weight percent of a mixture of hydrolysis products and partial condensates of one or more silane additives, based on the total solids of the composition, and/or an amount of colloidal silica or a metal oxide or combinations thereof, equivalent to from about 0.1 to about 75 weight percent solids, based on the total solids of the composition;

(3) an aqueous organic solvent mixture containing from about 10 to about 90 weight percent, based on the total solids of the composition, of a mixture of hydrolysis products and partial condensates of an epoxy functional silane, from about 1 to about 90 weight percent, based on the total solids of the composition, of a carboxylic acid functional compound selected from the group consisting of carboxylic acids, multifunctional carboxylic acids, anhydrides, and combinations thereof, from about 1 to 90 weight percent, based on the total weight of the composition, of a metal oxide composite colloid, and from about 1 to 75 weight percent, based on the total solids of the composition, of a colloidal silica material, the coating compositions may further include from about 0.1 to about 50 weight percent of a mixture of hydrolysis products and partial condensates of one or more silane additives, based on the total solids of the composition;

(4) an aqueous organic solvent mixture containing from about 10 to about 90 weight percent, based on the total solids of the composition, of a mixture of hydrolysis products and partial condensates of an epoxy functional silane, from about 1 to about 90 weight percent, based on the total weight of the composition, of a carboxylic acid functional compound selected from the group consisting of carboxylic acids, multifunctional carboxylic acids, anhydrides, and combinations thereof, from about 1 to 90 weight percent, based on the total solids of the composition, of a metal oxide composite colloid, from about 1 to 75 weight percent, based on the total solids of the composition, of a colloidal silica material, and from about 1 to 75 weight percent, based on the total solids of the composition, of a tetrafunctional silane;

(5) an aqueous organic solvent mixture containing from about 10 to about 90 weight percent, based on the total solids of the composition, of a mixture of hydrolysis products and partial condensates of an epoxy functional silane, from about 1 to about 90 weight percent, based on the total weight of the composition, of a carboxylic acid functional compound selected from the group consisting of carboxylic acids, multifunctional carboxylic acids, anhydrides, and combinations thereof, from about 1 to 90 weight percent, based on the total solids of the composition, of a metal oxide composite colloid, and from about 1 to 75 weight percent, based on the total solids of the composition, of a disilane; and (6) combinations thereof.

2. The composition of claim 1 wherein the hydrolysis products and partial condensates of the epoxy functional silane and the tetrafunctional silane are present in the aqueous-organic solvent mixture in an amount of from about 10 to about 99.9 weight percent, based on the total solids of the coating composition and wherein the multifunctional compound is present in the aqueous-organic solvent mixture in an amount of from about 0.1 to about 30 weight percent, based on the total solids of the coating composition.

3. The composition of claim 1 wherein the solvent constituent of the aqueous-organic solvent mixture is selected from the group consisting of an alcohol, an ether, a glycol, a glycol ether, an ester, a ketone, a glycolether acetate and mixtures thereof.

4. The composition of claim 1 wherein the solvent constituent of the aqueous-organic solvent mixture is an alcohol having the general formula ROH where R is an alkyl group containing from 1 to about 10 carbon atoms.

5. The composition of claim 1 wherein the solvent constituent of the aqueous-organic solvent mixture is selected from the group consisting of a glycol, an ether, a glycol ether and mixtures thereof having the formula $R^1$—$(OR^2)_x$—$OR^1$ where x is an integer of 0, 1, 2, 3 or 4, $R^1$ is H or an alkyl group containing from 1 to about 10 carbon atoms and $R^2$ is an alkylene group containing from 1 to about 10 carbon atoms and combinations thereof.

6. The composition of claim 1 wherein the epoxy functional silane is present in a molar ratio to the tetrafunctional silane of from about 0.1:1 to about 3:1.

7. The composition of claim 1 wherein the epoxy functional silane is represented by the formula $R^3_x Si(OR^4)_{4-x}$ where x is an integer of 1, 2 or 3, $R^3$ is H, an alkyl group, a functionalized alkyl group, an alkylene group, an aryl group, an alkyl ether, and combinations thereof containing from 1 to about 10 carbon atoms and having at least 1 epoxy functional group, and $R^4$ is H, an alkyl group containing from 1 to about 5 carbon atoms, an acetyl group, a —$Si(OR^5)_{3-y}R^6_y$ group where y is an integer of 0, 1, 2, or 3, and combinations thereof where $R^5$ is H, an alkyl group containing from 1 to about 5 carbon atoms an acetyl group, another —$Si(OR^5)_{3-y}R^6_y$ group and combinations thereof, and $R^6$ is H, an alkyl group, a functionalized alkyl group, an alkylene group, an aryl group, an alkyl ether and combinations thereof containing from 1 to about 10 carbon atoms.

8. The composition of claim 7 wherein the tetrafunctional silane is represented by the formula $Si(OR^7)_4$ where $R^7$ is H, an alkyl group containing from 1 to about 5 carbon atoms and ethers thereof, an $(OR^7)$ carboxylate, a —$Si(OR^8)_3$ group where $R^8$ is a H, an alkyl group containing from 1 to about 5 carbon atoms and ethers thereof, an $(OR^8)$ carboxylate, another —$Si(OR^8)_3$ group and combinations thereof.

9. The composition of claim 1 wherein the hydrolysis products and partial condensates of the epoxy functional silane and the tetrafunctional silane are present in the aqueous-organic solvent mixture in an amount of from about 10 to about 99.9 weight percent, based on the total solids of the coating composition and wherein the multifunctional compound is present in the aqueous-organic solvent mixture in an amount of from about 0.1 to about 30 weight percent, based on the total solids of the coating composition and wherein the epoxy functional silane is represented by the formula $R^3_x Si(OR^4)_{4-x}$ where x is an integer of 1, 2 or 3, $R^3$ is H, an alkyl group, a functionalized alkyl group, an alkylene group, an aryl group, an alkyl ether, and combinations thereof containing from 1 to about 10 carbon atoms and having at least 1 epoxy functional group, and $R^4$ is H, an alkyl group containing from 1 to about 5 carbon atoms, an acetyl group, a —$Si(OR^5)_{3-y}R^6_y$ group where y is an integer of 0, 1, 2, or 3, and combinations thereof where $R^5$ is H, an alkyl group containing from 1 to about 5 carbon atoms, an acetyl group, or another —$Si(OR^5)_{3-y}R^6_y$ group and combinations thereof, and $R^6$ is H, an alkyl group, a functionalized alkyl group, an alkylene group, an aryl group, an alkyl ether, and combinations thereof containing from 1 to about 10 carbon atoms.

10. The composition of claim 9 wherein the tetrafunctional silane is represented by the formula $Si(OR^7)_4$ where $R^7$ is H, an alkyl group containing from 1 to about 5 carbon atoms and ethers thereof, an $(OR^7)$ carboxylate, a —$Si(OR_8)_3$ group where $R^8$ is a H, an alkyl group containing from 1 to about 5 carbon atoms and ethers thereof, an $(OR^8)$ carboxylate, another —$Si(OR^8)_3$ group and combinations thereof.

11. The composition of claim 10 wherein the solvent constituent of the aqueous-organic solvent mixture is an alcohol having the general formula ROH where R is an alkyl group containing from 1 to about 10 carbon atoms.

12. The composition of claim 10 wherein the solvent constituent of the aqueous-organic solvent mixture is selected from the group consisting of a glycol, an ether, a glycol ether and mixtures thereof having the formula $R^1$—$(OR^2)_x$—$OR^1$ where x is an integer of 0, 1, 2, 3 or 4, $R^1$ is H or an alkyl group containing from 1 to about 10 carbon atoms and $R^2$ is an alkylene group containing from 1 to about 10 carbon atoms and combinations thereof.

13. The composition of claim 10 wherein the amount of water present in the aqueous-organic solvent mixture is an amount sufficient to provide a substantially homogeneous mixture of hydrolysis products and partial condensates of the epoxy functional silane and the tetrafunctional silane.

14. The composition of claim 1 wherein the tetrafunctional silane is represented by the formula $Si(OR^7)_4$ where $R^7$ is H, an alkyl group containing from 1 to about 5 carbon atoms and ethers thereof, an $(OR^7)$ carboxylate, a —$Si(OR_8)_3$ group where $R^8$ is a H, an alkyl group containing from 1 to about 5 carbon atoms and ethers thereof, an $(OR^8)$ carboxylate, another —$Si(OR^8)_3$ group and combinations thereof.

15. The composition of claim 1 wherein at least a portion of the solvent component of the aqueous-organic solvent mixture is generated during hydrolysis of the epoxy functional silane and the tetrafunctional silane.

16. The composition of claim 1 further comprising an effective amount of a catalyst to provide enhanced abrasion resistance to a coating produced by curing the composition.

17. The composition of claim 16 wherein the effective amount of the catalyst is from about 0.1 to about 10 weight percent, based on the total solids of the composition.

18. The composition of claim 17 wherein the aqueous-organic solvent mixture further comprises from about 0.1 to about 50 weight percent, based on the total solids of the composition, of a mixture of hydrolysis products and partial condensates of a silane additive represented by the formula $$R^9_x Si(OR^{10})_{4-x}$$

where x is an integer of 1, 2 or 3, $R^9$ is H, an alkyl group containing from 1 to about 10 carbon atoms, a functionalized alkyl group, an alkylene group, an aryl group, an alkyl ether group and combinations thereof, $R^{10}$ is H, an alkyl group containing from 1 to about 10 carbon atoms, an acetyl group and combinations thereof.

19. The composition of claim 18 wherein the aqueous-organic solvent mixture further comprises:
an effective amount of a leveling agent to spread the aqueous-organic solvent mixture on the substrate and provide substantially uniform contact of the aqueous-organic solvent mixture with the substrate.

20. The composition of claim 1 wherein the aqueous-organic solvent mixture further comprises from about 0.1 to about 50 weight percent, based on the total solids of the composition, of a mixture of hydrolysis products and partial condensates of a silane additive represented by the formula $$R^9_x Si(OR^{10})_{4-x}$$

where x is an integer of 1, 2 or 3, $R^9$ is H, an alkyl group containing from 1 to about 10 carbon atoms, a functionalized alkyl group, an alkylene group, an aryl group an alkyl ether group and combinations thereof, $R^{10}$ is H, an alkyl group containing from 1 to about 10 carbon atoms, an acetyl group and combinations thereof.

21. The composition of claim 20 wherein the aqueous-organic solvent mixture further comprises:
an effective amount of a leveling agent to spread the aqueous-organic solvent mixture on the substrate and provide substantially uniform contact of the aqueous-organic solvent mixture with the substrate.

22. The composition of claim 1 wherein the aqueous-organic solvent mixture further comprises:
from about 0.1 to about 50 weight percent, based on the total solids of the composition, of a mixture of hydrolysis products and partial condensates of a silane additive represented by the formula $$R^9_x Si(OR^{10})_{4-x}$$

where x is an integer of 1, 2 or 3, $R^9$ is H, an alkyl group containing from 1 to about 10 carbon atoms, a functionalized alkyl group, an alkylene group, an aryl group an alkyl ether group and combinations thereof, $R^{10}$ is H, an alkyl group containing from 1 to about 10 carbon atoms, an acetyl group and combinations thereof; and
an effective amount of colloidal silica to provide the composition with from about 0.1 to about 50 weight percent silica, based on the total of solids present in the composition.

23. The composition of claim 19 further comprising an effective amount of a catalyst to provide enhanced abrasion resistance to a coating produced by curing the composition.

24. The composition of claim 22 wherein the effective amount of the catalyst is from about 0.1 to about 10 weight percent, based on the total solids of the composition.

25. The composition of claim 22 wherein the aqueous-organic solvent mixture further comprises:
an effective amount of a leveling agent to spread the aqueous-organic solvent mixture on the substrate and provide substantially uniform contact of the aqueous-organic solvent mixture with the substrate.

26. The composition of claim 1 wherein the aqueous-organic solvent mixture further comprises:
an effective amount of colloidal silica to provide the composition with from about 0.1 to about 50 weight percent silica, based on the total of solids present in the composition.

27. The composition of claim 26 wherein the aqueous-organic solvent mixture further comprises:
an effective amount of leveling agent to spread the aqueous-organic solvent mixture on the substrate and provide substantially uniform contact of the aqueous-organic solvent mixture with the substrate.

28. The composition of claim 27 wherein the aqueous-organic solvent mixture further comprises an effective amount of a catalyst to provide enhanced abrasion resistance to the coating produced by curing the aqueous solvent mixture.

29. The composition of claim 28 wherein the effective amount of catalyst present in the aqueous-organic solvent mixture is from about 0.1 to about 10 weight percent, based on the total solids of the aqueous-organic solvent mixture.

30. The composition of claim 28 wherein the aqueous-organic solvent mixture further comprises from about 0.1 to about 50 weight percent, based on the total of solids of the aqueous-organic solvent mixture, of a mixture of hydrolysis products and partial condensates of a silane additive represented by the formula $$R^9_x Si(OR^{10})_{4-x}$$

where x is an integer of 1, 2 or 3, $R^9$ is H, an alkyl group containing from 1 to about 10 carbon atoms, a functionalized alkyl group, an alkylene group, an aryl group, an alkyl ether group and combinations thereof, $R^{10}$ is H, an alkyl group containing from 1 to about 10 carbon atoms, an acetyl group and combinations thereof.

31. The composition of claim 1 wherein the aqueous-organic solvent mixture further comprises:
an effective amount of a leveling agent to spread the aqueous-organic solvent mixture on the substrate and provide substantially uniform contact of the aqueous-organic solvent mixture with the substrate.

* * * * *

UNITED STATES PATENT AND TRADEMARK OFFICE
CERTIFICATE OF CORRECTION

PATENT NO. : 7,097,704 B1  Page 1 of 1
APPLICATION NO. : 10/667005
DATED : August 29, 2006
INVENTOR(S) : Youngun Pae It is certified that error appears in the above-identified patent and that said Letters Patent is hereby corrected as shown below:

Column 3, line 62: Delete " (OR5) " and replace with -- $(OR^5)$ --

Column 10, line 55: Delete " (R9O) " and replace with -- $(R^9O)$ --

Column 21, line 43: Delete " (OR5) " and replace with -- $(OR^5)$ --

Column 22, line 43: Delete " (OR8) " and replace with -- $(OR^8)$ --

Signed and Sealed this

Seventeenth Day of April, 2007

JON W. DUDAS
*Director of the United States Patent and Trademark Office*